United States Patent
Lim et al.

(10) Patent No.: US 11,133,886 B2
(45) Date of Patent: Sep. 28, 2021

(54) APPARATUS AND METHOD FOR CONTROLLING INTERFERENCE BETWEEN SERVICES IN WIRELESS COMMUNICATION SYSTEM

(71) Applicants: Samsung Electronics Co., Ltd, Suwon-si (KR); Postech Academy-Industry Foundation, Pohang-si (KR)

(72) Inventors: Jongbu Lim, Seoul (KR); Jubum Kim, Seoul (KR); Joon Ho Cho, Seoul (KR); Chanhong Kim, Suwon-si (KR); Yeohun Yun, Hwaseong-si (KR); Sungnam Hong, Suwon-si (KR); Taeyoung Kim, Seoul (KR); Jiyun Seol, Seongnam-si (KR)

(73) Assignees: Samsung Electronics Co., Ltd., Suwon-si (KR); Postech Academy-Industry Foundation, Pohang-si (KR)

(*) Notice: Subject to any disclaimer, the term of this patent is extended or adjusted under 35 U.S.C. 154(b) by 227 days.

(21) Appl. No.: 15/633,490

(22) Filed: Jun. 26, 2017

(65) Prior Publication Data
US 2017/0373781 A1    Dec. 28, 2017

(30) Foreign Application Priority Data

Jun. 27, 2016 (KR) .................. 10-2016-0079895

(51) Int. Cl.
*H04L 12/00* (2006.01)
*H04J 11/00* (2006.01)
(Continued)

(52) U.S. Cl.
CPC ........ *H04J 11/0023* (2013.01); *H04B 17/345* (2015.01); *H04J 11/003* (2013.01);
(Continued)

(58) Field of Classification Search
None
See application file for complete search history.

(56) References Cited

U.S. PATENT DOCUMENTS

2015/0256308 A1    9/2015    Ma et al.
2015/0280871 A1   10/2015    Xu et al.
(Continued)

OTHER PUBLICATIONS

Li, P., et al., "On the Distribution of Sinr for the MMSE MIMO Receiver and Performance Analysis," IEEE Transactions on Information Theory, vol. 52, No. 1, Jan. 2006, pp. 271-286.
(Continued)

*Primary Examiner* — Noel R Beharry
*Assistant Examiner* — Lionel Preval

(57) ABSTRACT

The present disclosure relates to a $5^{th}$ generation (5G) or pre-5G communication system for supporting a higher data transfer rate after a $4^{th}$ generation (4G) communication system such as long term evolution (LTE). A method for operating of a transmitting end in a wireless communication system includes allocating a first resource for a first service and a second resource for a second service, determining a precoder for controlling interference between the first service and the second service, precoding a first signal for the first service using the precoder, and transmitting the precoded first signal and a second signal for the second service through the first resource and the second resource. At least one part of the first resource overlaps with the second resource.

10 Claims, 19 Drawing Sheets

(51) Int. Cl.
*H04B 17/345* (2015.01)
*H04L 5/00* (2006.01)
*H04W 24/02* (2009.01)
*H04W 74/00* (2009.01)
*H04W 88/08* (2009.01)

(52) U.S. Cl.
CPC .......... *H04L 5/0073* (2013.01); *H04L 5/0092* (2013.01); *H04W 24/02* (2013.01); *H04W 74/002* (2013.01); *H04W 88/08* (2013.01)

(56) References Cited

U.S. PATENT DOCUMENTS

| | | | |
|---|---|---|---|
| 2017/0111930 A1* | 4/2017 | Rajagopal | H04W 74/006 |
| 2017/0290013 A1* | 10/2017 | McCoy | H04L 5/005 |
| 2017/0318593 A1* | 11/2017 | Eriksson | H04L 5/006 |
| 2018/0115355 A1* | 4/2018 | Nagata | H04W 16/28 |
| 2018/0160372 A1* | 6/2018 | Benjebbour | H04W 24/10 |
| 2018/0205534 A1* | 7/2018 | Yl | H04L 5/1469 |
| 2018/0242264 A1* | 8/2018 | Pelletier | H04W 52/346 |
| 2019/0013881 A1* | 1/2019 | Olesen | H04B 17/318 |
| 2019/0253923 A1* | 8/2019 | Kang | H04W 56/001 |

OTHER PUBLICATIONS

Tse, D., et al., "Linear Multiuser Receivers in Random Environments," IEEE Transactions on Information Theory, vol. 46, No. 1, Jan. 2000, pp. 171-188.

* cited by examiner

APPARATUS AND METHOD FOR CONTROLLING INTERFERENCE BETWEEN SERVICES IN WIRELESS COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Jun. 27, 2016 and assigned Serial No. 10-2016-0079895, the entire disclosure of which is hereby incorporated by reference.

TECHNICAL FIELD

The present disclosure generally relates to wireless communication, and in particular, to an apparatus and method for mitigating interference between services in a wireless environment.

BACKGROUND

To meet a demand on wireless data traffic which has been in an increasing trend after a $4^{th}$ generation (4G) communication system was commercialized, there is an ongoing effort to develop an improved $5^{th}$ generation (5G) communication system or a pre-5G communication system. For this reason, the 5G communication system or the pre-5G communication system is called a beyond 4G network communication system or a post long term evolution (LTE) system.

To achieve a high data transfer rate, the 5G communication system is considered to be implemented in a mmWave band (e.g., such as a 60 GHz band). To reduce a propagation path loss at the mmWave band and to increase a propagation delivery distance, beamforming, massive multiple input multiple output (MIMO), full dimensional MIMO (FD-MIMO), array antenna, analog beam-forming, and large scale antenna techniques are under discussion in the 5G communication system.

In addition, to improve a network of a system, techniques such as an evolved small cell, an advanced small cell, a cloud radio access network (RAN), an ultra-dense network, device to device (D2D) communication, a wireless backhaul, a moving network, cooperative communication, coordinated multi-points (CoMP), and reception interference cancellation, or the like are being developed in the 5G communication system.

In addition thereto, hybrid frequency shift keying and quadrature amplitude modulation (FQAM) and sliding window superposition coding (SWSC) as an advanced coding modulation (ACM) technique and filter bank multi carrier (FBMC), non-orthogonal multiple access (NOMA), and sparse code multiple access (SCMA), or the like as an advanced access technology are being developed in the 5G system.

SUMMARY

To address the above-discussed deficiencies, it is a primary object to provide an apparatus and method for controlling interference between services in a wireless communication system In addition, the present disclosure provides an apparatus and method for controlling interference between services by using precoding in a wireless communication system.

In addition, the present disclosure provides an apparatus and method for determining a precoder for controlling interference in a wireless communication system.

In addition, the present disclosure provides an apparatus and method for determining a sub-precoder for controlling power in a wireless communication system.

In addition, the following descriptions provide an apparatus and method for determining a sub-precoder for controlling an overlapping resource between services in a wireless communication system.

According to various exemplary embodiments of the present disclosure, a method for operating of a transmitting end in a wireless communication system includes allocating a first resource for a first service and a second resource for a second service, determining a precoder for controlling interference between the first service and the second service, precoding a first signal for the first service using the precoder, and transmitting the precoded first signal and a second signal for the second service through the first resource and the second resource. At least one part of the first resource overlaps with the second resource.

According to various exemplary embodiments of the present disclosure, a method for operating of a receiving end in an wireless communication system includes receiving from a transmitting end a first signal for a first service through a first resource for the first service, determining a reception matrix corresponding to a precoder used in the transmitting end to control interference between the first service and the second service, and decoding the first signal for the first service by using the reception matrix. At least one part of the first resource overlaps with a second resource for the second service.

According to various exemplary embodiments of the present disclosure, a transmitting end apparatus in a wireless communication system includes at least one processor for allocating a first resource for a first service and a second resource for a second service, determining a precoder for controlling interference between the first service and the second service, and precoding a first signal for the first service using the precoder, and a transceiver for transmitting the precoded first signal and a second signal for the second service through the first resource and the second resource. At least one part of the first resource overlaps with the second resource.

According to various exemplary embodiments of the present disclosure, a receiving end apparatus in a wireless communication system includes a transceiver for receiving from a transmitting end a first signal for a first service through a first resource for the first service, and at least one processor for determining a reception matrix corresponding to a precoder used in the transmitting end to control interference between the first service and the second service, and decoding the first signal for the first service by using the reception matrix. At least one part of the first resource overlaps with a second resource for the second service.

An apparatus and method according to various exemplary embodiments of the present disclosure can mitigate interference between services using an overlapping resource.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

Terms used in the present disclosure are used to describe a particular exemplary embodiment only and are not intended to limit a scope of other exemplary embodiments. A singular expression may include a plural expression unless there is a contextually distinctive difference therebetween. Terms (including technical and scientific terms) used herein have the same meaning as commonly understood by those ordinarily skilled in the art described in the present disclosure. Terms defined in commonly used dictionaries among the terms used in the present disclosure should be interpreted as having a meaning that is consistent with their meaning in the context of the related art, and will not be interpreted in an idealized or overly formal sense unless explicitly defined in the present disclosure. Optionally, terms defined in the present disclosure cannot be interpreted to exclude exemplary embodiments of the present disclosure.

A hardware-based access method is described for example in various exemplary embodiments of the present disclosure described hereinafter. However, since various exemplary embodiments of the present disclosure include a technique in which hardware and software are both used, a software-based access method is not excluded in the exemplary embodiments of the present disclosure.

The present disclosure relates to an apparatus and method for controlling interference between services in a wireless communication system.

Terms referring to a communication service type (e.g., Ultra-Reliable and Low-Latency (URLL), enhanced mobile broadband (eMBB)), a signal processing means (e.g., a precoder), resource information (e.g., a frequency resource, a transmission time interval (TTI)), control information (e.g., feedforward information, feedback information), network entities, messages, constitutional elements of a device, or the like are used for convenience of explanation in the present disclosure. Therefore, the present disclosure is not limited to terms described below, and thus other terms having equivalent technical meanings may also be used.

For example, the term "precoder" used hereinafter implies a vector or matrix for processing signals, and may be replaced with a "precoding matrix" or a "beamforming matrix." In addition, optionally, the term "precoder" may be replaced with a processor, module, or functional block for processing a signal by using the vector or the matrix, and may be replaced with a "beamformer," "a precoding unit," or the like.

Figure 1:
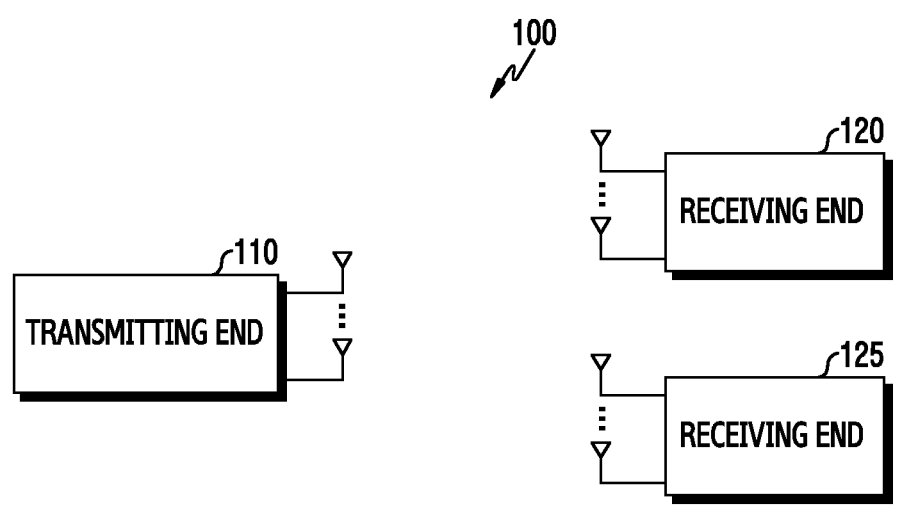
FIG. 1 illustrates an example wireless communication system according to various exemplary embodiments of the present disclosure.

FIG. 1 illustrates an example wireless communication system according to various exemplary embodiments of the present disclosure.

Referring to FIG. 1, a wireless communication system 100 includes a transmitting end 110 and receiving ends 120 and 125. The transmitting end 110 and the receiving ends 120 and 125 may correspond to a user device or a network device. The network device may include a base station, a nodeB, an evolved nodeB, or the like. The user device may include a terminal, a mobile station, a user equipment, or the like. For example, the transmitting end 110 may correspond to the base station, and the receiving ends 120 and 125 may correspond to the terminal. For another example, the transmitting end 110 may correspond to the terminal, and the receiving ends 120 and 125 may correspond to the base station.

Each of the transmitting end 110 and the receiving ends 120 and 125 may include a plurality of antennas for data communication. The transmitting end 110 transmits a signal including data to the receiving ends 120 and 125. For example, the transmitting end 110 may transmit the signal including data to the receiving ends 120 and 125 in a mmWave band (e.g., a 60 GHz band). To mitigate a propagation pathloss and to increase a propagation distance in the mmWave band, the transmitting end 110 may use techniques such as beamforming, multiple input multiple output (MIMO), full dimension MIMO (FD-MIMO), or the like.

As described above, the transmitting end 110 may be the base station or the terminal, and the receiving ends 120 and 125 may be the terminal or the base station. For convenience of description, hereinafter, it is assumed in various exemplary embodiments described below that the base station functions as the transmitting end 110, and the terminals function as the receiving ends 120 and 126. That is, a downlink communication situation is assumed in the various exemplary embodiments described below. However, uplink communication is not excluded in the present disclosure. That is, the following various exemplary embodiments are also applicable to uplink communication.

Figure 2:
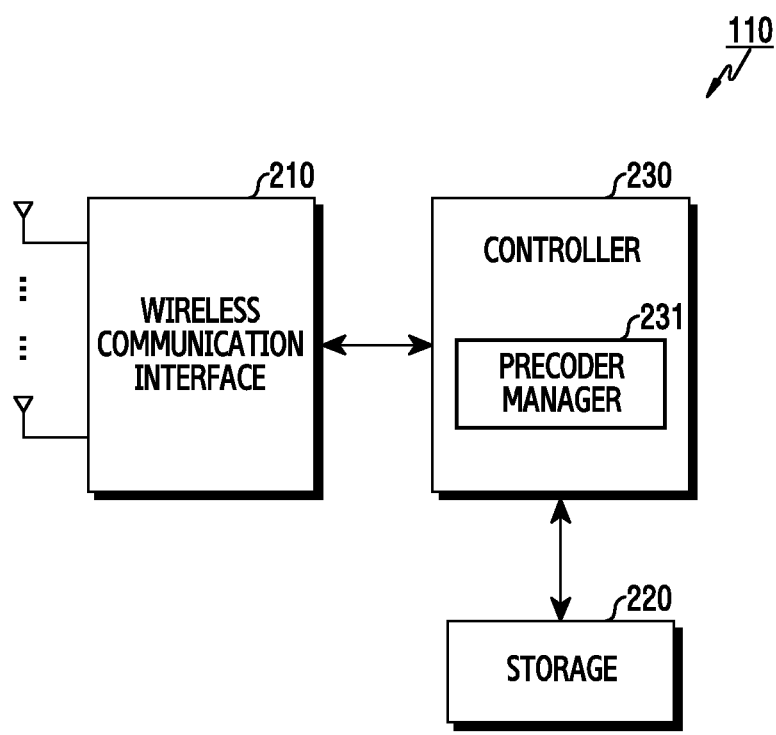
FIG. 2 illustrates an example functional structure of a transmitting end in a wireless communication system according to various exemplary embodiments of the present disclosure.

FIG. 2 illustrates an example functional structure of a transmitting end in a wireless communication system according to various exemplary embodiments of the present disclosure. Referring to FIG. 2, a structure of the transmitting end 110 is exemplified in FIG. 2. Hereinafter, the term " . . . unit," " . . . device," or the like implies a unit of processing at least one function or operation, and may be implemented in hardware or software or in combination of the hardware and the software. As shown in FIG. 2, the transmitting end 110 includes a wireless communication interface 210, a storage 220, and a controller 230.

The wireless communication interface 210 performs functions for transmitting and receiving a signal through a radio channel. For example, the wireless communication interface 210 performs a function of conversion between a baseband signal and a bit-stream according to a physical layer standard of a system. For example, in data transmission, the wireless communication interface 210 generates complex symbols by coding and modulating a transmission bit-stream. In addition, in data reception, the wireless communication interface 210 restores a reception bit-stream by demodulating and decoding a baseband signal. For this, the wireless communication interface 210 may include a modulator. In addition, the wireless communication interface 210 up-converts a baseband signal into a radio frequency (RF) signal and thereafter transmits the RF signal through an antenna, and down-converts an RF signal received through the antenna into a baseband signal. For example, the wireless communication interface 210 may include a transmission filter, a reception filter, an amplifier, a mixer, an oscillator, a digital to analog convertor (DAC), an analog to digital convertor (ADC), or the like.

In addition, the wireless communication interface 210 may include a plurality of RF chains. Further, the wireless communication interface 210 may perform beamforming. For the beamforming, the wireless communication interface 210 may adjust a phase and magnitude of each of signals transmitted and received through a plurality of antennas or antenna elements, that is, may perform analog beamforming. Alternatively, the wireless communication interface 210 may perform beamforming for a digital signal, that is, digital beamforming. For example, the wireless communication interface 210 may perform a function of a precoder.

The wireless communication interface 210 transmits and receives a signal as described above. Accordingly, the wireless communication interface 210 may be referred to as a transmitter, a receiver, or a transceiver. In addition, in the following description, transmission and reception performed through a radio channel are used to imply that the aforementioned processing is performed by the wireless communication interface 210.

The storage 220 stores data such as a basic program, application program, configuration information, or the like for an operation of the transmitting end 110. The storage 220 may consist of a volatile memory, a non-volatile memory, or a combination of the volatile memory and the non-volatile memory. In addition, the storage 220 provides stored data according to a request of the controller 230.

The controller 230 controls overall operations of the transmitting end 110. For example, the controller 230 transmits and receives a signal via the wireless communication interface 210. Further, the controller 230 writes data to the storage 220 and reads the data. For this, the controller 230 may include at least one processor. Further, the controller 230 may allocate a resource for various services. In this case, according to an attribute of services, the controller 230 may allocate a specific resource to different services in an overlapping manner. According to one exemplary embodiment, the controller 230 determines a precoder for controlling interference generated between a first service and a second service. For this, the controller 230 may further include a precoder manager 231. Accordingly, the controller 230 controls the transmitting end 110 to perform a procedure based on various exemplary embodiments described below.

Figure 3:
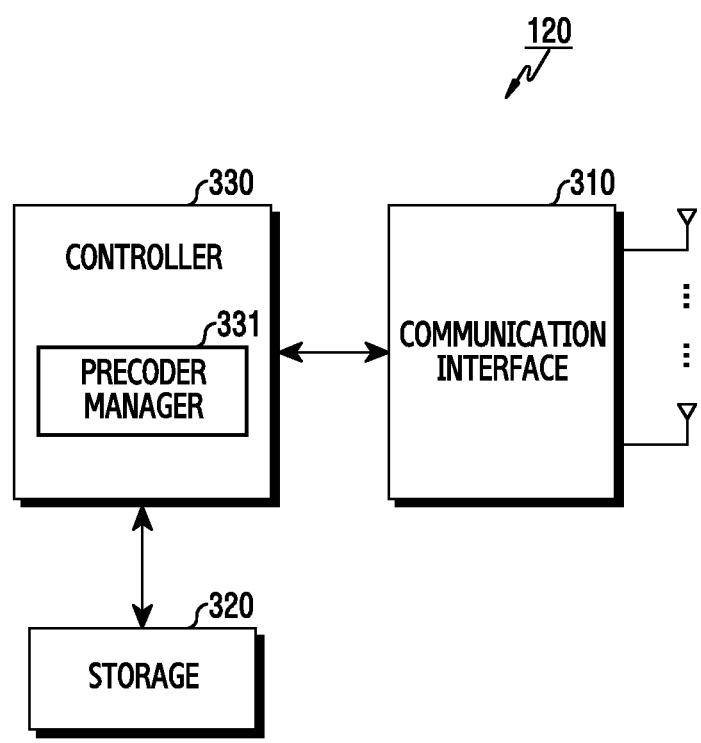
FIG. 3 illustrates an example functional structure of a receiving end in a wireless communication system according to various exemplary embodiments of the present disclosure.

FIG. 3 illustrates an example functional structure of a receiving end in a wireless communication system according to various exemplary embodiments of the present disclosure. Referring to FIG. 3, a structure of the receiving end 120 is exemplified in FIG. 3. Hereinafter, the term "... unit," "... device," or the like implies a unit of processing at least one function or operation, and may be implemented in hardware or software or in combination of the hardware and the software. Referring to FIG. 3, the receiving end 120 includes a communication interface 310, a storage 320, and a controller 330.

The communication interface 310 performs functions for transmitting and receiving a signal through a radio channel. For example, the communication interface 310 performs a function of conversion between a baseband signal and a bit-stream according to a physical layer standard of a system. For example, in data transmission, the communication interface 310 generates complex symbols by coding and modulating a transmission bit-stream. In addition, in data reception, the communication interface 310 restores a reception bit-stream by demodulating and decoding a baseband signal. For this, the communication interface 310 may include a demodulator. In addition, the communication interface 310 up-converts a baseband signal into an RF signal and thereafter transmits the RF signal through an antenna, and down-converts an RF signal received through the antenna into a baseband signal. For example, the communication interface 310 may include a transmission filter, a reception filter, an amplifier, a mixer, an oscillator, a DAC, an ADC, and the like.

In addition, the communication interface 310 may include a plurality of RF chains. Further, the communication interface 310 may perform beamforming. For beamforming, the communication interface 310 may adjust a phase and magnitude of each of signals transmitted and received through a plurality of antennas or antenna elements, that is, may perform analog beamforming. Alternatively, the communication interface 310 may perform beamforming for a digital signal, that is, digital beamforming.

The communication interface 310 transmits and receives a signal as described above. Accordingly, the communication interface 310 may be referred to as a transmitter, a receiver, or a transceiver. In addition, in the following description, transmission and reception performed through a radio channel are used to imply that the aforementioned processing is performed by the communication interface 310.

The storage 320 stores data such as a basic program, application program, configuration information, or the like for an operation of the receiving end 120. The storage 320 may consist of a volatile memory, a non-volatile memory, or a combination of the volatile memory and the non-volatile memory. In addition, the storage 320 provides stored data according to a request of the controller 330.

The controller 330 controls overall operations of the receiving end 120. For example, the controller 330 transmits and receives a signal via the communication interface 310. Further, the controller 330 writes data to the storage 320 and reads the data. For this, the controller 330 may include at least one processor or micro-processor, or may be one part of the processor. Further, the part of the communication interface 310 and the controller 330 may be referred to as a communication processor (CP). In one exemplary embodiment, the controller 330 determines a precoder for controlling interference generated between a first service and a second service. The controller 330 decodes a signal for a URLL service on the basis of the precoder. For this, the controller 330 may further include a precoder manager 331. The controller 330 may control the receiving end 120 to perform a procedure based on various exemplary embodiments described below.

Figure 4:
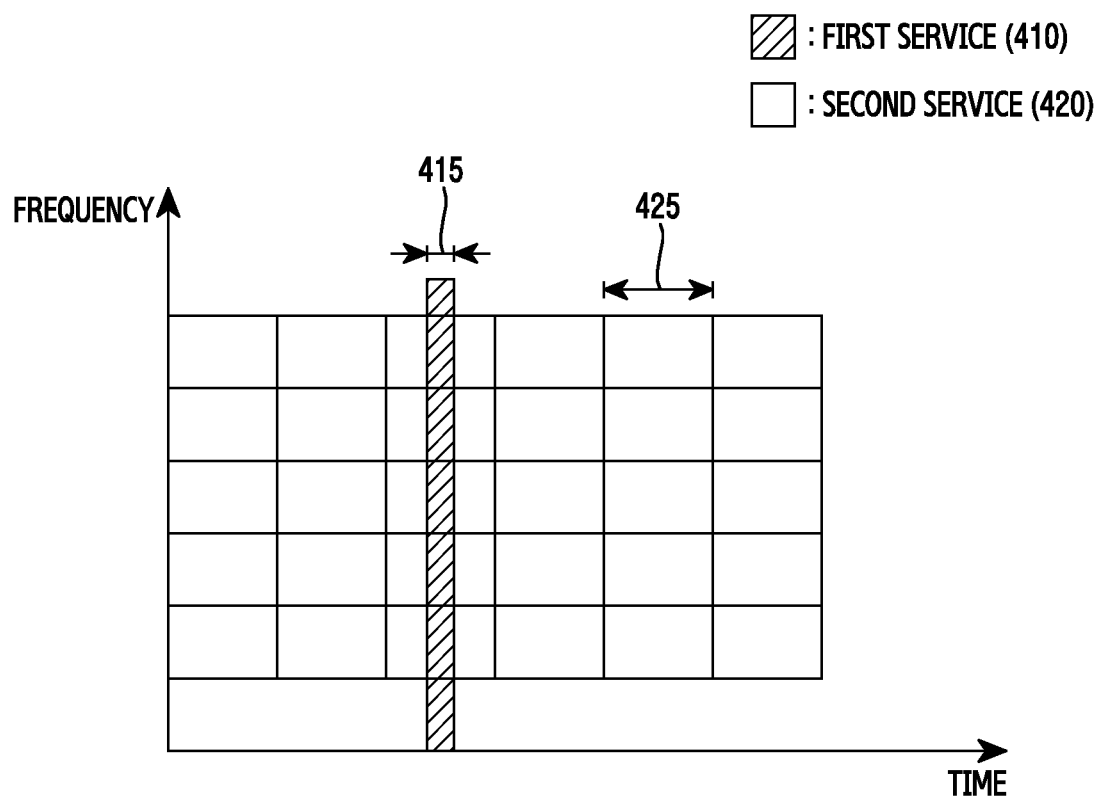
FIG. 4 illustrates an example resource allocation for services in a wireless communication system according to various exemplary embodiments of the present disclosure.

FIG. 4 illustrates an example resource allocation for services in a wireless communication system according to various exemplary embodiments of the present disclosure.

Referring to FIG. 4, a first service 410 and a second service 420 may be provided. Herein, the first service 410 implies a service which requires high reliability and low latency. In this case, the first service 410 may be referred to as a URLL service. The first service 410 may be used in a technique having a relatively high requirement in terms of reliability, latency time, and throughput. For example, the first service 410 may be used to control a communication procedure required in disaster networks, telesurgeries, autonomous vehicles, or the like.

In addition, the second service 420 implies a service which requires a high data transfer rate. In this case, the second service 420 may be referred to as an eMBB service. The second service 420 may be used in a technique which requires high average spectrum efficiency. For example, the second service 420 may be used in a typical mobile communication, virtual reality technique, or the like. In one exemplary embodiment, the transmitting end 110 may provide both of the first service 410 and the second service 420 to the receiving end 120.

A TTI 415 for the first service 410 is set to be short to ensure low latency in a radio duration. However, a TTI 425 for the second service 420 is set to be long to increase data transmission efficiency. That is, the TTI 415 for the first service 410 is shorter than the TTI 425 for the second service 420. For example, the TTI 415 may be 0.25 ms, and the TTI 425 may be 1 ms. According to one exemplary embodiment, as shown in FIG. 4, a start point of the TTI 415 may be identical to any point other than a start point of the TTI 425. In another exemplary embodiment, the start point of the TTI 415 may be identical to the start point of the TTI 425.

The TTI 415 for the first service 410 may deliver control information and traffic for the first service 410. That is, at least one part of the TTI 415 for the first service 410 may be used to transmit control information (e.g., resource allocation information, feedforward information) for the first service 410. The control information transmitted through the TTI 415 may be valid only for a corresponding TTI, or may be a valid for a plurality of TTIs.

A resource for the first service 410 and a resource for the second service 420 may be allocated independently of each other. Therefore, the TTI 415 for the first service 410 may overlap with the TTI 425 for the second service 420. This may be for allowing the first service 410 to be provided during the second service 420 is provided, if the first service 410 needs to be provided urgently. In other words, due to the urgency of the first service 410, the resource for the first service 410 may be allocated in a state where the resource for the second service 420 is allocated. Accordingly, even if the resources are allocated by one object, the resource for the first service 401 may overlap with the resource for the second service 420.

As described with reference to FIG. 4, the resources for the different services (e.g., the first service 410 and the second service 420) may overlap. That is, since resources are limited, if a service requires a great amount of resources, the service may inevitably use resources of other services. In this case, interference is generated between the different services, which may lead to deterioration of service quality and decrease in user satisfaction. Therefore, there is a need for a technique for cancelling interference generated when the resources for the different services overlap. In this case, precoding may be used to cancel the interference generated when the resources for the different services overlap. Hereinafter, various exemplary embodiments are described to control the interference between the services which use the overlapping resources by using the precoding.

Figure 5:
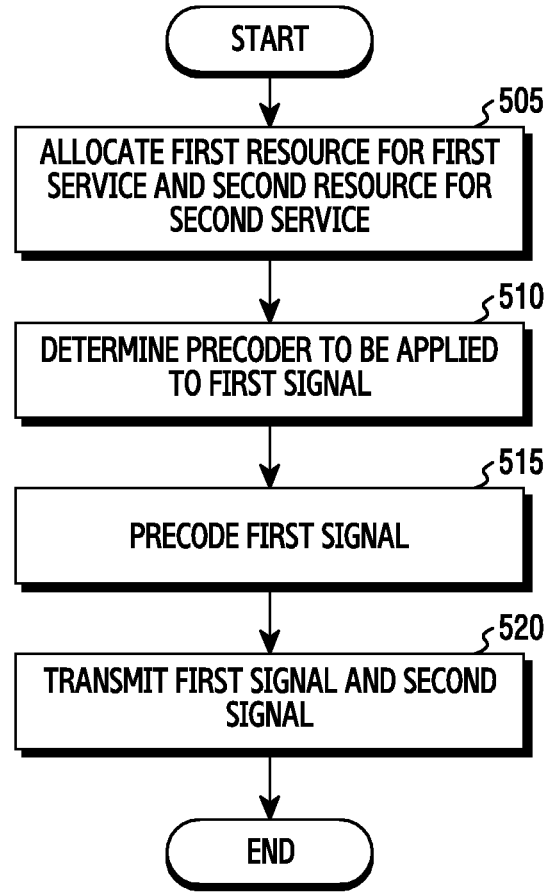
FIG. 5 illustrates an example method of operating a transmitting end in a wireless communication system according to various exemplary embodiments of the present disclosure.

FIG. 5 illustrates an example method of operating a transmitting end in a wireless communication system according to various exemplary embodiments of the present disclosure.

Referring to FIG. 5, in step 505, the transmitting end 110 allocates a first resource for a first service and a second resource for a second service. In this case, at least one part of the first resource for the first service may overlap with the second resource for the second service. Interference may be generated between the first service and the second service due to an overlapped region of the first resource and the second resource.

In step 510, the transmitting end 110 determines a precoder for controlling the interference between the first service and the second service. That is, the transmitting end 110 determines a precoder to be applied to a first signal by considering the overlapped region. Specifically, the transmitting end 110 uses the overlapped region to determine the precoder for controlling the interference generated between the first service and the second service. For example, the precoder may be determined on the basis of at least one of power for the first signal, power for the second signal, the first resource for the first service, the second resource for the second service, a maximum resource that can be used by the transmitting ends 110, and the overlapped region.

In step 515, the transmitting end 110 precodes the first signal. That is, the transmitting end 110 precodes the first signal for the first service by using the precoder. Herein, precoding may be performed for a digital signal or an analog signal. That is, the transmitting end 110 generates the precoded first signal by multiplying the precoder to the first signal before analog conversion or the first signal after analog conversion. In this case, the precoding may be performed only for a signal to be transmitted through the overlapped region among the first signals, or may be performed for all of the first signals. According to another exemplary embodiment, additionally, the transmitting end 110 may precode the second signal for the second service.

In step 520, the transmitting end 110 transmits the first signal for the first service and the second signal for the second service. That is, the transmitting end 110 transmits the first signal for the first service and the second signal for the second service by using the first resource and the second resource.

Figure 6:
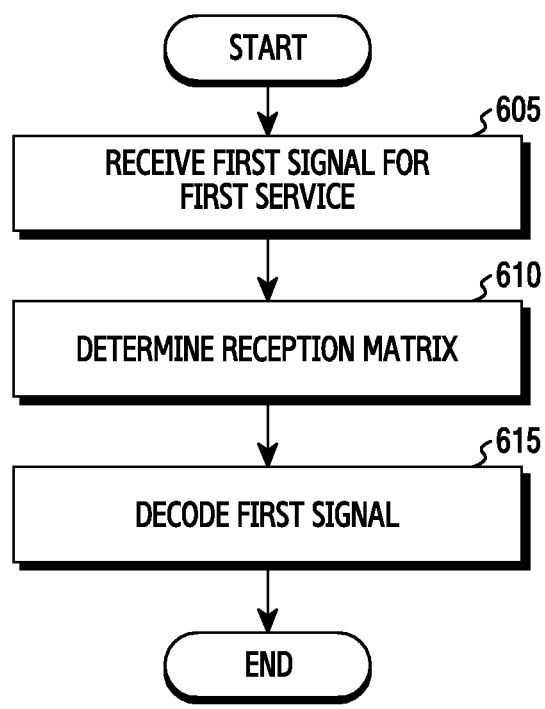
FIG. 6 illustrates an example method of operating a receiving end in a wireless communication system according to various exemplary embodiments of the present disclosure.

FIG. 6 illustrates an example method of operating a receiving end in a wireless communication system according to various exemplary embodiments of the present disclosure.

Referring to FIG. 6, in step 605, the receiving end 120 receives a first signal for a first service by using a first resource for the first service from the transmitting end 110. In this case, at least one part of the first resource may overlap with a second resource for a second service. Interference may be generated between the first service and the second service due to an overlapped region of the first resource and the second resource.

In step 610, the receiving end 120 determines a reception matrix corresponding to a precoder used in the transmitting end 110 in order to control the interference between the first service and the second service. Specifically, the receiving end 120 determines the precoder used in the transmitting end 110 in order to cancel the interference generated due to the overlapped region of the first resource and the second resource. For example, the precoder may be determined on the basis of at least one of power for the first signal, power for the second signal, the first resource for the first service, the second resource for the second service, a maximum resource that can be used by the transmitting ends 110, and the overlapped region. For example, the receiving end 120 may determine the precoder used in the transmitting 110 by retrieving a codebook including a plurality of predefined precoders. In this case, at least one of power information and resource information may be used as a look-up parameter. In some exemplary embodiments, upon receiving an indicator related to the precoder from the transmitting end 110, the receiving end 120 may determine the precoder on the basis of the indicator. The receiving end 120 determines the reception matrix corresponding to the determined precoder.

In step 615, the receiving end 120 decodes the first signal. That is, the receiving end 120 decodes the first signal for the first service by using the reception matrix. For example, the receiving end 120 determines a reception filter corresponding to the precoder, and decodes the first signal by using the reception filter.

As described above, according to various exemplary embodiments, precoding may be used to control the interference between the services. The precoder for interference control may be defined in various forms. For instance, the precoder may be defined as a combination of a plurality of sub-precoders determined in various manners. For example, the precoder may be defined as a combination of a first sub-precoder for controlling power and a second sub-precoder for controlling an overlapped region influenced by the interference. Specifically, the precoder may be configured as shown in FIG. 7 described below.

Figure 7:
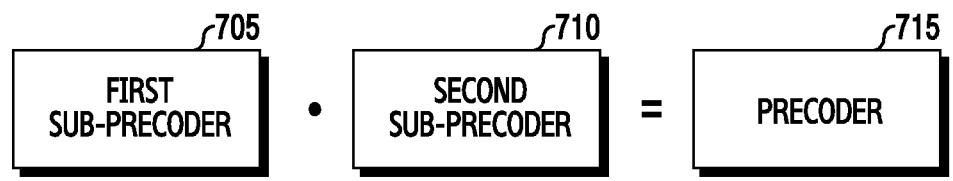
FIG. 7 illustrates an example structure of a precoder in a wireless communication system according to various exemplary embodiments of the present disclosure.

FIG. 7 illustrates an example of a structure of a precoder in a wireless communication system according to various exemplary embodiments of the present disclosure. Referring to FIG. 7, a precoder 715 may be defined as a product of a first sub-precoder 705 for controlling power and a second sub-precoder 710 for controlling an overlapped region influenced by the interference. That is, the precoder 715 may be defined by equation (1) below.

Although the present disclosure has been described with an exemplary embodiment, various changes and modifications may be suggested to one skilled in the art. It is intended that the present disclosure encompass such changes and modifications as fall within the scope of the appended claims.

$$T_u = \hat{I} \Lambda_u \quad (1)$$

where $T_u$ denotes the precoder 715, $\hat{I}$ denotes the second sub-precoder 710, and $\Lambda_u$ denotes the first sub-precoder 705.

The first sub-precoder 705 may be defined in a matrix form as shown in equation (2) below to control power.

$$\Lambda_u = \begin{bmatrix} \sqrt{x} I_{N-M} & 0 \\ 0 & \sqrt{y} I_{L+M-N} \\ 0 & 0 \end{bmatrix} \quad (2)$$

where $\Lambda_u$ denotes the first sub-precoder 705. x denotes power for a non-overlapped region except for the overlapped region among the first resources. y denotes power for the overlapped region among the first resources. $I_{N-M}$ denotes an identity matrix having a size of N−M. $I_{L+M-N}$ denotes an identity matrix having a size of L+M−N.

N−M denotes a size of the non-overlapped region. L+M−N denotes a size of the overlapped region.

If the first sub-precoder 705 is determined to minimize a Mean Square Error (MSE) for total subcarriers of the first signal, x and y may be defined by equation (3) below.

$$\text{if } \frac{P_u}{(N-M)\sqrt{\sigma_u^2}} \geq \sqrt{\sigma_u^2 + \frac{P_e}{M}} - \sqrt{\sigma_u^2} \quad (3)$$

$$x = \left( \frac{P_u + (N-M)\sigma_u^2 + (L+M-N)(\sigma_u^2 + P_e/M)}{(N-M)\sqrt{\sigma_u^2} + (L+M-N)\sqrt{\sigma_u^2 + P_e/M}} \right) \cdot \sqrt{\sigma_u^2} - \sigma_u^2$$

$$y = \left( \frac{P_u + (N-M)\sigma_u^2 + (L+M-N)(\sigma_u^2 + P_e/M)}{(N-M)\sqrt{\sigma_u^2} + (L+M-N)\sqrt{\sigma_u^2 + P_e/M}} \cdot \sqrt{\sigma_u^2 + \frac{P_e}{M}} \right) - \left( \sigma_u^2 + \frac{P_e}{M} \right)$$

where x denotes power of the first signal for the non-overlapped region except for the overlapped region among the first resources. y denotes power of the first signal for the overlapped region among the first resources. $P_u$ denotes power for the first signal. $P_e$ denotes power for the second signal. $\sigma_u^2$ denotes power for a channel noise. N is a size of a maximum resource that can be used by the transmitting end 110. L is a size of the first resource for transmitting the first signal by the transmitting end 110. M is a size of the second resource for transmitting the second signal by the transmitting end 110.

If the first sub-precoder 705 is determined to equally adjust an MSE for each of subcarriers of the first signal, x and y may be defined by equation (4) below.

$$x = \frac{P_u \sigma_u^2}{(N-M)\sigma_u^2 + (L+M-N)(\sigma_u^2 + P_e/M)} \quad (4)$$

$$y = \frac{P_u(\sigma_u^2 + P_e/M)}{(N-M)\sigma_u^2 + (L+M-N)(\sigma_u^2 + P_e/M)}$$

where x denotes power for the non-overlapped region except for the overlapped region among the first resources. y denotes power for the overlapped region among the first resources. $P_u$ denotes power for the first signal. $P_e$ denotes power for the second signal. $\sigma_u^2$ denotes power for a channel noise. N is a size of a maximum resource that can be used by the transmitting end 110. L is a size of the first resource for transmitting the first signal by the transmitting end 110. M is a size of the second resource for transmitting the second signal by the transmitting end 110. In this case, since a value obtained by dividing x by $\sigma_u^2$ is equal to a value obtained by dividing y by a sum of $\sigma_u^2$ and $P_e/M$, signal to interference plus noise ratio (SINR) performance for the overlapped region is equal to SINR performance for the non-overlapped region.

However, if performance of the first service is improved when power is not allocated for the overlapped region since power of the first signal for the first service is significantly low, x and y may be defined by equation (5) below.

$$\text{if } \frac{P_u}{(N-M)\sqrt{\sigma_u^2}} < \sqrt{\sigma_u^2 + \frac{P_e}{M}} - \sqrt{\sigma_u^2} \quad (5)$$

$$x = \frac{P_u}{N-M}$$

$$y = 0$$

where x denotes power for the non-overlapped region except for the overlapped region among the first resources. y denotes power for the overlapped region among the first resources. $P_u$ denotes power for the first signal. $P_e$ denotes power for the second signal. $Y_u^2$ denotes power for a channel noise. N is a size of a maximum resource that can be used by the transmitting end 110. M is a size of the second resource for transmitting the second signal.

The second sub-precoder 710 may be defined in a matrix form as shown in equation (6) below to adjust the overlapped region.

$$\hat{I}_N = \begin{bmatrix} U_{N-M} & 0 \\ 0 & U_M \end{bmatrix} \quad (6)$$

where $\hat{I}$ denotes the second sub-precoder 710. $U_{N-M}$ denotes a unitary matrix having a size of N−M. $U_M$ denotes a unitary matrix having a size of M.

If the second sub-precoder 710 is determined to concentrate interference to a minimum overlapped region required to transmit the first signal, $U_M$ of equation (6) above may be defined by as shown in equation (7) below.

$$U_M = \begin{bmatrix} U_{L+M-N} & 0 \\ 0 & U_{N-L} \end{bmatrix} \quad (7)$$

where $U_{N-M}$ denotes a unitary matrix having size of N−M. $U_{L+M-N}$ denotes a unitary matrix having a size of L+M−N. $U_{L+M-N}$ is not any unitary matrix but a unitary matrix of which all components have the same size. For example, $U_{L+M-N}$ may be a discrete Fourier transform (DFT) matrix, an inverse discrete Fourier transform (IDFT) matrix, or a hadamard matrix. $U_{N-L}$ denotes any unitary matrix having a size of N−L. Equation (7) above may be normalized to be defined in a matrix form as shown in equation (8) below.

$$U_M = \begin{bmatrix} U_K & 0 \\ 0 & U_{N-K} \end{bmatrix}, (L+M-N \leq K \leq M) \quad (8)$$

where $U_K$ denotes a unitary matrix having a size of K. $U_{N-K}$ denotes a unitary matrix having a size of N−K. N denotes a size of a maximum resource that can be used by the transmitting end 110. L denotes a size of the first resource for transmitting the first signal. M denotes a size of the second resource for transmitting the second signal. K denotes a size of the overlapped region. L+M−N denotes a size of a minimum overlapped region for transmitting the first signal.

In addition, if the second sub-precoder 710 is determined on the basis of a maximum overlapped region for transmitting the first signal, the second sub-precoder 710 may be defined as shown in equation (6) above. In other words, if the second sub-precoder 710 is determined to distribute interference to the overlapped region adjusted to have the same size as the second resource, the second sub-precoder 710 may be defined as shown in equation (6) above. However, if the second sub-precoder 710 is determined on the basis of the maximum overlapped region for transmitting the first signal, $U_M$ of equation (6) above is not any unitary matrix but a unitary matrix of which all components have the same size. For example, $U_M$ of equation (6) above may be a DFT matrix, an IDFT matrix, or a hadamard matrix.

Minimization of an MSE for the first signal using the precoder 715 is defined as shown in equation (9) below.

$$\underset{T_u, R_u}{\text{minimize}} E[\|\underline{x}_u - \hat{\underline{x}}_u\|^2] = \underset{T_u, R_u}{\text{minimize}} E[\|\underline{x}_e - R_u \underline{y}_u\|^2] \quad (9)$$

$$= \underset{T_u, R_u}{\text{minimize}} E[\|\underline{x}_u - R_u(T_u \underline{x}_u + T_e \underline{x}_e + N_u)\|^2]$$

where $T_u$ denotes a precoder for the first signal determined by the transmitting end 110. That is, $T_u$ denotes the precoder 715. $\underline{x}_u$ denotes a first transmission signal vector transmitted by the transmitting end 110. $\hat{\underline{x}}_u$ denotes an estimated first reception signal vector. $\underline{x}_e$ denotes a second transmission signal vector transmitted by the transmitting end 110. $\underline{y}_u$ denotes a first reception signal vector received by the receiving end 120 with respect to the first signal. $N_u$ denotes a channel noise for the first signal. $R_u$ denotes a first reception matrix for estimating the first signal. $R_u$ is defined as shown in equation (10) below to minimize an MSE of the first transmission signal vector $\underline{x}_u$.

$$R_u = T_u^H (T_u T_u^H + T_e T_e^H + \sigma_u^2 I_N)^{-1} \quad (10)$$

where $R_u$ denotes a first reception matrix for estimating the first signal. $T_u^H$ denotes a hermitian matrix of a precoder for the first service. $T_e^H$ denotes a hermitian matrix of a precoder for the second service. $T_u$ denotes a precoder for the first signal determined by the transmitting end 110. $T_e$ denotes a precoder for the second signal determined by the transmitting end 110. $\sigma_u^2$ denotes power for a channel noise. $I_N$ denotes an identity matrix having a size of N.

If equation (10) above is applied to equation (9) above, the minimization of the MSE for the first transmission signal vector $\underline{x}_u$ is summarized as shown in equation (11) below.

$$\underset{T_u, R_u}{\text{minimize}} E[\|\underline{x}_u - R_u(T_u \underline{x}_u + T_e \underline{x}_e + N_u)\|^2] = \quad (11)$$

$$\underset{T_u}{\text{minimize}} \underset{R_u}{\text{minimize}} E[\|\underline{x}_u - R_u(T_u \underline{x}_u + T_e \underline{x}_e + N_u)\|^2] =$$

$$\underset{T_u}{\text{minimize}} tr E[(\underline{x}_u - R_u(T_u \underline{x}_u + T_e \underline{x}_e + N_u))\underline{x}_u^H] =$$

$$\underset{T_u}{\text{minimize}} tr E[(\underline{x}_u \underline{x}_u^H - R_u(T_u \underline{x}_u \underline{x}_u^H + T_e \underline{x}_e \underline{x}_u^H + N_u \underline{x}_u^H))] =$$

$$\underset{T_u}{\text{minimize}} tr(I_L - R_u T_u) =$$

$$\underset{T_u}{\text{minimize}} tr\left(I_L - T_u^H (T_u T_u^H + T_e T_e^H + \sigma_u^2 I_N)^{-1} T_u\right) =$$

$$\underset{T_u}{\text{minimize}} tr\left((I_L + T_u^H (T_u T_u^H + \sigma_u^2 I_N)^{-1} T_u)^{-1}\right) =$$

$$\underset{T_u}{\text{minimize}} tr\left((I_L + T_u^H A_N^{-1} T_u)^{-1}\right)$$

where $$A_N = T_e T_e^H + \sigma_u^2 I_N = \begin{bmatrix} \sigma_u^2 I_{N-M} & 0 \\ 0 & (\sigma_u^2 + P_e/M)I_M \end{bmatrix}$$

where Tu denotes a precoder for the first signal determined by the transmitting end 110. Te denotes a precoder for the second signal determined by the transmitting end 110. Ru denotes a first reception matrix for estimating the first signal. xu denotes a first transmission signal vector transmitted by the transmitting end 110. xe denotes a second transmission signal vector transmitted by the transmitting end 110. Nu denotes a channel noise for the first signal. $\underline{x}_u^H$ denotes a hermitian matrix of the first transmission signal vector. $T_u^H$ denotes a hermitian matrix of a precoder for the first service. $T_e^H$ denotes a hermitian matrix of a precoder for the second service. IN denotes an identity matrix having a size of N. $\sigma_u^2$ denotes power for a channel noise. Pe denotes power for the second signal. M is a size of the second resource for transmitting the second signal by the transmitting end 110.

Herein, a physical meaning of $\Lambda_N$ is as follows. Diagonal components of $\Lambda_N$ imply N subcarriers. Since first (N–M) components among the diagonal components of $\Lambda_N$ correspond to the non-overlapped regions, respective noises having power of $\sigma_u^2$ are present as noises for (N–M) subcarriers. Since last M components among the diagonal components of $\Lambda_N$ correspond to the second resource for the second signal, noises having power (i.e., $\sigma_u^2$+Pe/M) equal to a sum of power $\sigma_u^2$ for respective channel noises and power $P_e$/M obtained by dividing power $P_e$ for the second signal by the number of M subcarriers are present as noises for M subcarriers.

Figure 8:
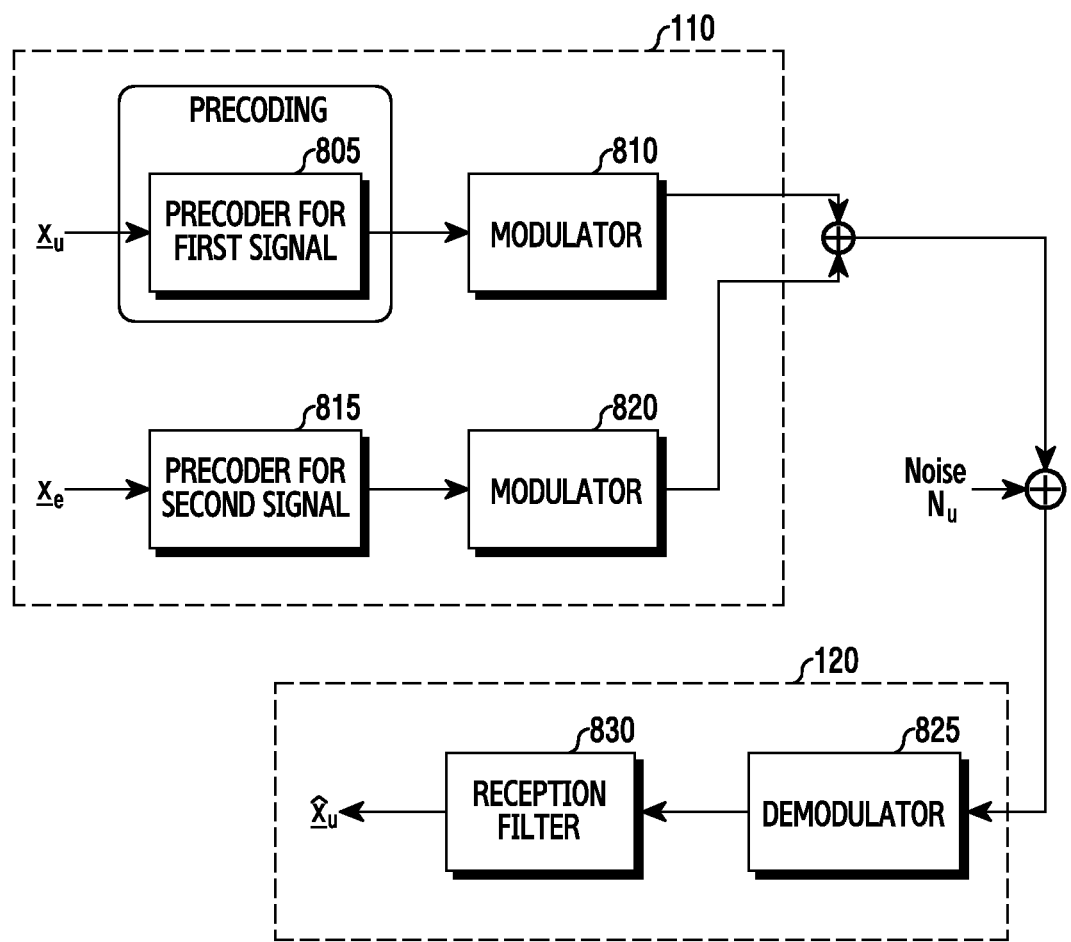
FIG. 8 illustrates an example transmitting a signal of a transmitting end and estimating a signal of a receiving end in a wireless communication system according to various exemplary embodiments of the present disclosure.

FIG. 8 illustrates an example transmitting a signal of a transmitting end and estimating a signal of a receiving end in a wireless communication system according to various exemplary embodiments of the present disclosure.

Referring to FIG. 8, a precoder 805 for a first signal of the transmitting end 110 is determined by considering an overlapped region of a first resource for a first service and a second resource for a second service. In some exemplary embodiments, the precoder 805 for the first signal may be a precoder based on a predetermined codebook according to at least one of power for the overlapped region, power for a non-overlapped region, the first resource, the second resource, and a maximum resource that can be used by the transmitting end 110. The precoder 805 for the first signal precodes the first signal for the first service. That is, the precoder 805 for the first signal generates the precoded first signal by multiplying the first signal by the precoder 805 for the first signal. In this case, the precoder 805 may be a precoder separated from an MIMO precoder for applying an MIMO technique. That is, although not shown, the transmitting end 110 may further include another precoder for MIMO transmission.

A modulator 810 of the transmitting end 110 modulates the precoded first signal. The modulator 810 modulates the precoded first signal by using various modulation schemes. For example, the modulator 810 modulates the first signal by using an orthogonal frequency division multiplexing (OFDM) scheme. Specifically, the modulator 810 maps the first signal to subcarriers and constructs a signal of a frequency domain. The modulator 810 performs inverse fast Fourier transform (IFFT) to transform a frequency domain signal into a time domain signal and inserts a cyclic prefix (CP) to constitute a baseband OFDM symbol.

In step 815, a precoder 815 for the second signal of the transmitting end 110 precodes the second signal for the second service. When the precoder 815 for the second signal precodes the second signal by using the second resource allocated for the second service, the precoder 815 for the second signal may be defined as shown in equation (12) below.

$$T_e = \begin{bmatrix} 0 \\ I_M \end{bmatrix} \quad (12)$$

where $T_e$ denotes the precoder 815 for the second signal. $I_M$ denotes an identity matrix having a size of M.

A modulator 820 of the transmitting end 110 modulates the precoded second signal. The modulator 820 modulates the precoded second signal by using various modulation schemes. For example, the modulator 820 modulates the second signal by using the OFDM scheme. Specifically, the modulator 820 maps the second signal to subcarriers and constructs a frequency domain signal. The modulator 810 performs IFFT to transform the frequency domain signal into a time domain signal and inserts a CP to constitute a baseband OFDM symbol.

A channel is a path through which the modulated first signal and the modulated second signal are transmitted to the receiving end 120. The channel may be a common channel for the first signal and the second signal according to the overlapped region. The channel may be an additive white gaussian noise (AWGN) channel.

The first signal for the first service and the second signal from the transmitting end 110 are received at the receiving end 120. The AWGN channel is assumed as a channel for a signal module for the first signal and the second signal, and reception signal vectors for the first and second signals received by the transmitting end 120 are as shown in equation (13) below.

$$\underline{y}_u = T_u \underline{x}_u + T_e \underline{x}_e + N_u$$

$$\underline{y}_e = T_e \underline{x}_e + T_u \underline{x}_u + N_e \quad (13)$$

where $\underline{y}_u$ denotes a first reception signal vector for the first signal received by the receiving end 120. $\underline{y}_e$ denotes a second reception signal vector for the second signal received by the receiving end 120. $T_u$ denotes a precoder for the first signal determined by the transmitting end 110. $T_e$ denotes a precoder for the second signal determined by the transmitting end 110. $\underline{x}_u$ denotes a first transmission signal vector transmitted by the transmitting end 110. $\underline{x}_e$ denotes a second transmission signal vector transmitted by the transmitting end 110. $N_u$ denotes a channel noise for the first signal. $N_e$ denotes a channel noise for the second signal.

A demodulator 825 of the receiving end 120 performs demodulation on a reception signal. For example, the demodulator 825 may transform a time domain signal into a frequency domain signal by performing a fast Fourier transform (FFT). A reception filter 830 of the receiving end 120 multiplies a first reception signal vector by the first reception matrix to estimate the first signal Although not shown, the receiving end 120 may further estimate the second signal. The estimated first signal vector and second signal vector are as shown in equation (14) below.

$$\hat{\underline{x}}_u = R_u(T_u \underline{x}_u + T_e \underline{x}_e + N_u)$$

$$\hat{\underline{x}}_e = R_e(T_e \underline{x}_e + T_u \underline{x}_u + N_e) \quad (14)$$

where $\hat{\underline{x}}_u$ denotes the estimated first reception signal vector. $\hat{\underline{x}}_e$ denotes the estimated second reception signal vector. $R_u$ denotes a first reception matrix for estimating the first signal. $R_e$ denotes a first reception matrix for estimating the first signal. $T_u$ denotes a precoder for the first signal determined by the transmitting end 110. $T_e$ denotes a precoder for the second signal determined by the transmitting end 110. $x_u$ denotes a first transmission signal vector transmitted by the transmitting end 110. $\underline{x}_e$ denotes a second transmission signal vector transmitted by the transmitting end 110. $N_u$ denotes a channel noise for the first signal. $N_e$ denotes a channel noise for the second signal.

Figure 9:
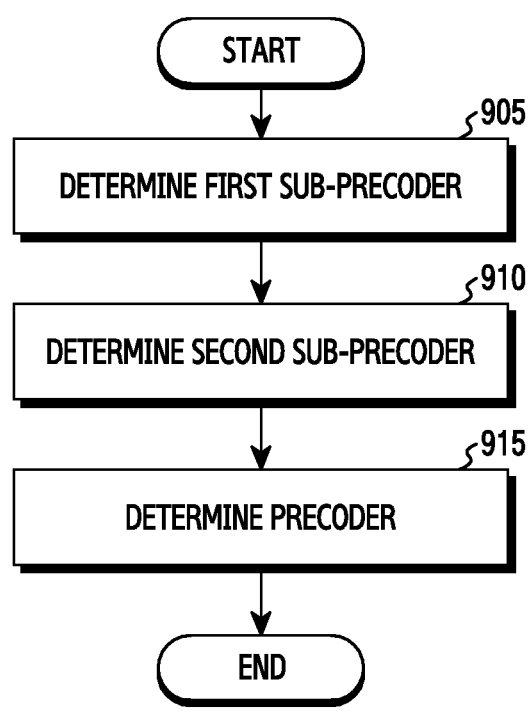
FIG. 9 illustrates an example method of operating a transmitting end for determining a precoder in a wireless communication system according to various exemplary embodiments of the present disclosure.

FIG. 9 illustrates an example method of operating a transmitting end for determining a precoder in a wireless communication system according to various exemplary embodiments of the present disclosure.

Referring to FIG. 9, in step 905, the transmitting 110 determines a first sub-precoder on the basis of power for a first signal for a first service. Specifically, the transmitting end 110 determines the first sub-precoder on the basis of power for an overlapped region of a second resource for a second service and a first resource for the first service and power for a non-overlapped region except for the overlapped region among the first resources. Herein, the transmitting end 110 determines the first power and the second power on the basis of a ratio of power for the first signal and power for the second signal. For example, the transmitting end 110 may determine the first sub-precoder as shown in equation (2) and equation (3), or equation (4).

In step 910, the transmitting end 110 determines a second sub-precoder on the basis of the overlapped region. That is, the transmitting end 110 determines the second sub-precoder by resiliently adjusting the overlapped region. Specifically, the transmitting end 110 may determine a range of the overlapped region according to power of the first signal and the second signal, and may determine the second sub-precoder according to the range of the overlapped region. That is, the transmitting end 110 determines the overlapped region on the basis of the ratio of power for the first signal and power for the second signal, a size of a maximum resource that can be used by the transmitting end 110, a size of the first resource, and a size of the second resource. For example, the transmitting end 110 may determine the second sub-precoder as shown in equation (6), equation (7), or equation (8).

In step 915, the transmitting end 110 determines a precoder on the basis of the first sub-precoder and the second sub-precoder. This is for the transmitting end 110 to cancel interference generated between services due to the overlapped region. For example, the precoder may be defined as a product of the first sub-precoder and the second sub-precoder.

Figure 10:
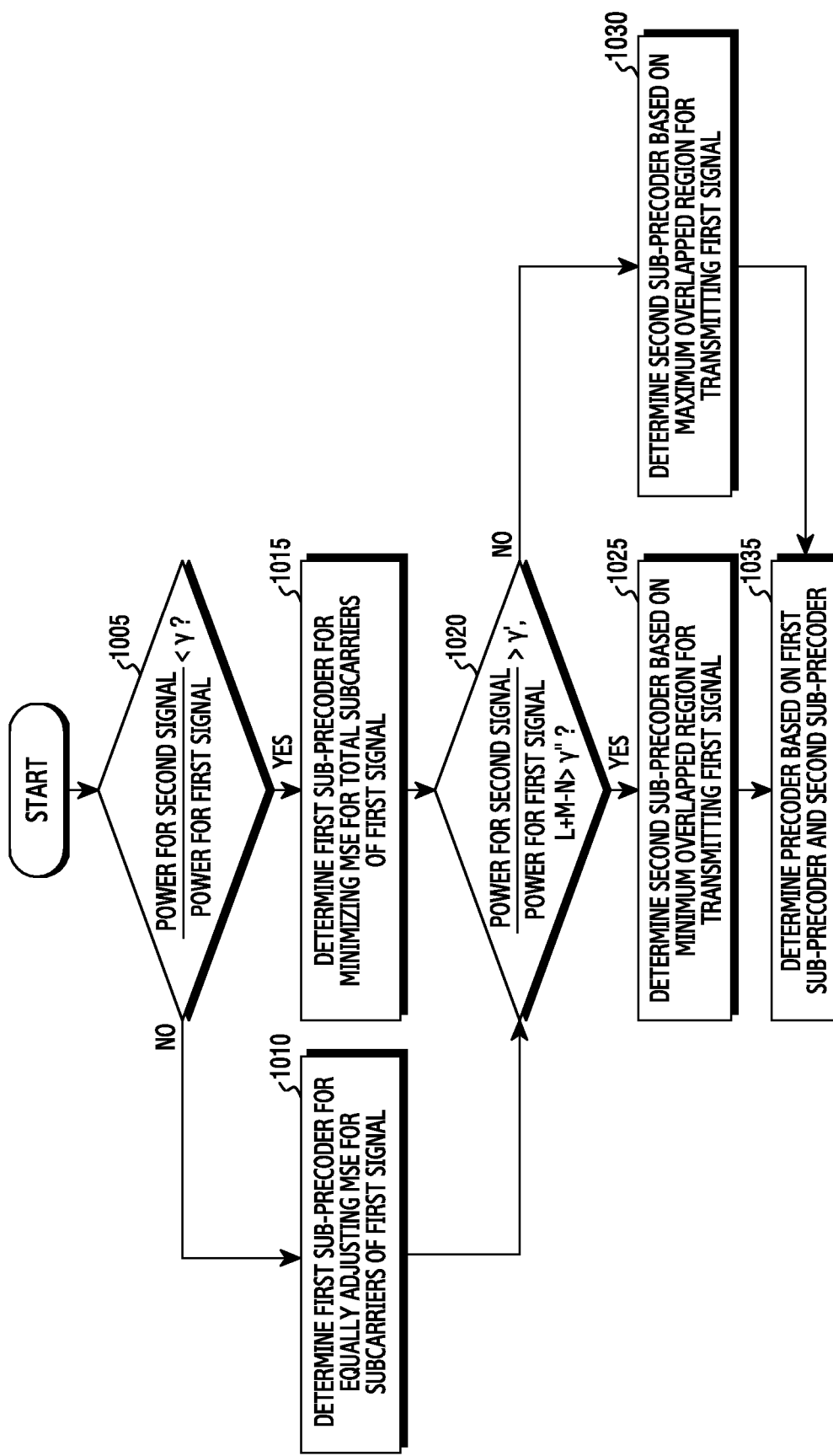
FIG. 10 illustrates another example method of operating a transmitting end for determining a precoder in a wireless communication system according to various exemplary embodiments of the present disclosure.

FIG. 10 illustrates another example method of operating a transmitting end for determining a precoder in a wireless communication system according to various exemplary embodiments of the present disclosure.

Referring to FIG. 10, in step 1005, the transmitting end 110 determines whether a ratio of power for a first signal for a first service and power for a second signal for a second service is less than a first threshold γ. The first threshold γ is determined on the basis of performance of the first service. For example, the first threshold γ may be predefined, or may adaptively change as a system variable. In some embodiments, the performance of the first service may be expressed as an SINR.

If the ratio of the power for the first signal and the power for the second signal is not less than the first threshold γ, proceeding to step 1010, the transmitting end 110 determines the first sub-precoder for equally adjusting an MSE for each of subcarriers of the first signal. That is, if the power for the second signal is relatively greater than the power for the first signal and thus the interference caused by the overlapped region is great, the transmitting end 110 determines the first sub-precoder for equally adjusting the MSE for each of subcarriers of the first signal. In this case, the transmitting end 110 determines the first sub-precoder defined according to equation (2) and equation (4).

If the ratio of the power for the first signal and the power for the second signal is less than the first threshold γ, proceeding to step 1015, the transmitting end 110 determines the first sub-precoder for minimizing an MSE for total subcarriers of the first signal. That is, if the power for the first signal is relatively greater than the power for the second signal and thus the interference caused by the overlapped region is not great, the transmitting end 110 determines the first sub-precoder for minimizing the MSE for total subcarriers of the first signal. In this case, the transmitting end 110 determines the first sub-precoder defined according to equation (2) and equation (3).

In step 1020, the transmitting end 110 determines whether the ratio of the power for the first signal for the first service and the power for the second signal for the second service is greater than a second threshold $\gamma'$, and determines whether L+M−N is greater than a third threshold $\gamma''$. Herein, L denotes a size of a first resource for the first service. M denotes a size of a second resource for the second service. N denotes a size of a maximum resource that can be used by the transmitting end 110. L+M−N denotes a size of a minimum overlapped region for transmitting the first signal. The second threshold $\gamma'$ and the third threshold $\gamma''$ are determined on the basis of performance of the second service.

If the ratio of the power for the first signal and the power for the second signal is greater than the second threshold $\gamma'$ and if L+M−N is greater than the third threshold $\gamma''$, proceeding to step 1025, the transmitting end 110 determines the second sub-precoder on the basis of a minimum overlapped region for transmitting the first signal. This is because, if the power for the second signal is relatively greater than the power for the first signal, interference having an effect on the second service is small. In addition, this is because, if the second sub-precoder is determined on the basis of a resource for the overlapped region adjusted to be equal to the size of the second resource, the power for the second signal is relatively greater than the power for the first signal, and thus performance improvement of the second service is relatively small. In this case, since one part of the first resource overlaps with the second resource, performance of the second service corresponding to each of subcarriers of the second resource is non-uniform. In addition, since one part of the second resource of the second service is strongly influenced by interference, a non-overlapped region except for the overlapped region among the second regions is not influenced by the interference. In this case, the transmitting end 110 determines the second sub-precoder defined according to equation (6) and equation (7).

On the other hand, if the ratio of the power for the first signal and the power for the second signal is less than the second threshold $\gamma'$ and if L+M−N is less than the third threshold $\gamma''$, proceeding to step 1030, the transmitting end 110 determines the second sub-precoder on the basis of a maximum overlapped region for transmitting the first signal. This is because, if the power for the second signal is relatively less than the power for the first signal, the second service is highly influenced by the interference, and if a resource of a narrow overlapped region is required for the first service, influence of great interference is concentrated on a narrow resource of the second service. That is, since the second sub-precoder is determined on the basis of an overlapped region adjusted to be equal to the size of the second resource, the transmitting end 110 may distribute the influence of small interference to wide resources of the second service to improve performance. In this case, since the first resource overlaps with the entirety of the second resource, performance of the second service corresponding to each of the second resources is uniform. In addition, since the entirety of the second resource of the second service is influenced by weak interference, improved performance of the second service can be expected for each of subcarriers of the second resource. In this case, the transmitting end 110 determines the first sub-precoder defined according to equation (6). However, $U_M$ in equation (6) above is not any identity matrix but an identity matrix of which all components have the same size.

In step 1035, the transmitting end 110 determines a precoder on the basis of the first sub-precoder and the second sub-precoder. This is for the transmitting end 110 to cancel interference generated due to the overlapped region. The precoder may be expressed by a product of the first sub-precoder and the second sub-precoder.

Figure 11:
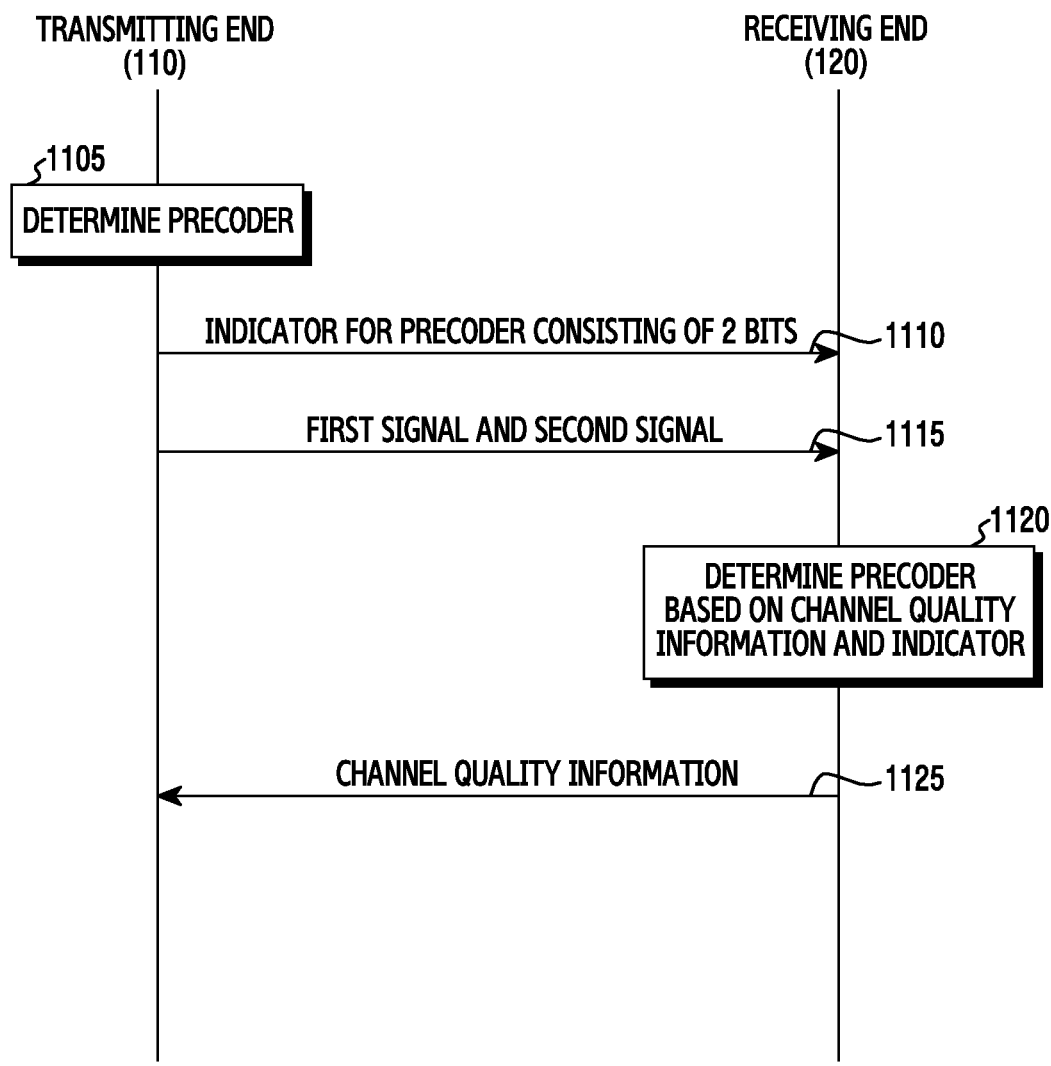
FIG. 11 illustrates an example signal flow between a transmitting end and a receiving end for determining a precoder indicated by two bits in a wireless communication system according to various exemplary embodiments of the present disclosure.

FIG. 11 illustrates an example signal flow between a transmitting end and a receiving end for determining a precoder indicated by two bits in a wireless communication system according to various exemplary embodiments of the present disclosure. FIG. 11 exemplifies a case where the transmitting end 110 feeds forward an indicator consisting of 2 bits to the receiving end 120, and receives information regarding a channel noise in a feedback manner from the receiving end 120. It is assumed that the transmitting end 110 and the receiving end 120 have information related to power for the first signal, information related to power for the second signal, allocation information of the first resource, and allocation information for the second resource. The information related to the power for the first signal and the second signal may be transmitted to the receiving end 120 together with the allocation information of the first resource and the second resource.

Referring to FIG. 11, in step 1105, the transmitting end 110 determines a precoder. Specifically, the transmitting end 110 determines the first sub-precoder on the basis of the first power for the overlapped region of the second resource and the first resource and the second power for the non-overlapped region except for the overlapped region among the first resources. Herein, the transmitting end 110 determines the first power and the second power according to a ratio of the power for the first signal and the power for the second signal. The transmitting end 110 determines the second sub-precoder by resiliently adjusting a resource for the overlapped region. Herein, the transmitting end 110 determines the resource for the overlapped region on the basis of the ratio of the power for the first signal and the power for the second signal, the maximum resource that can be used by the transmitting end 110, the first resource, and the second resource. The transmitting end 110 determines a precoder on the basis of the first sub-precoder and the second sub-precoder.

In step 1110, the transmitting end 110 transmits an indicator related to a precoder consisting of 2 bits to the receiving end 120. That is, the transmitting end 110 feeds forward the indicator related to the precoder consisting of 2 bits to the receiving end 120. In other words, the transmitting end 110 feeds forwards to the receiving end 120 a Most Significant Bit (MSB) of an indicator related to the first sub-precoder and a least significant bit (LSB) of an indicator related to the second sub-precoder. For example, if the indicator is 00, the indicator 00 indicates a precoder determined on the basis of the first sub-precoder for minimizing an MSE for total subcarriers of the first signal and the second sub-precoder based on a minimum overlapped region for transmitting the first signal. For another example, if the indicator is 01, the indicator 01 indicates a precoder determined on the basis of the first sub-precoder for minimizing the MSE for total subcarriers of the first signal and the second sub-precoder based on the maximum overlapped region for transmitting the first signal. For another example, if the indicator is 10, the indicator indicates a precoder based on the first sub-precoder for equally adjusting an MSE for each of subcarriers of the first resource and the second sub-precoder based on a minimum overlapped region for transmitting the first signal. For another example, if the indicator is 11, the indicator 11 indicates a precoder determined on the basis of the first sub-precoder for equally adjusting an MSE for each of subcarriers of the first resource and the second sub-precoder based on the maximum overlapped region for transmitting the first signal. Herein, the indicator may be transmitted through one part of the first resource. Alternatively, the indicator may be transmitted through a resource separated from the first resource.

In step 1115, the transmitting end 110 transmits the first signal and the second signal to the receiving end 120. That is, the transmitting end 110 transmits the precoded first signal and the second signal for the second service through the first resource and the second resource.

In step 1120, the receiving end 120 determines the precoder on the basis of channel quality and the indicator. In this case, the channel quality includes at least one of a signal to noise ratio (SNR), a channel quality indicator (CQI), a signal to interference plus noise ratio (SINR), and a carrier to interference plus noise ratio (CINR). The channel quality may include power information regarding a channel noise.

In step 1125, the receiving end 120 transmits information regarding the channel quality to the transmitting end 110. That is, the receiving end 120 feeds back information regarding the channel quality to the transmitting end 110.

In the exemplary embodiment described with reference to FIG. 11, it is described that the indicator to be fed forward has a size of 2 bits. However, the size of the indicator may vary according to various exemplary embodiments. For example, the size of the indicator may vary depending on the number of sub-precoders constituting a precoder, the number of selectable generation schemes of each sub-precoder, or the like.

Figure 12A:
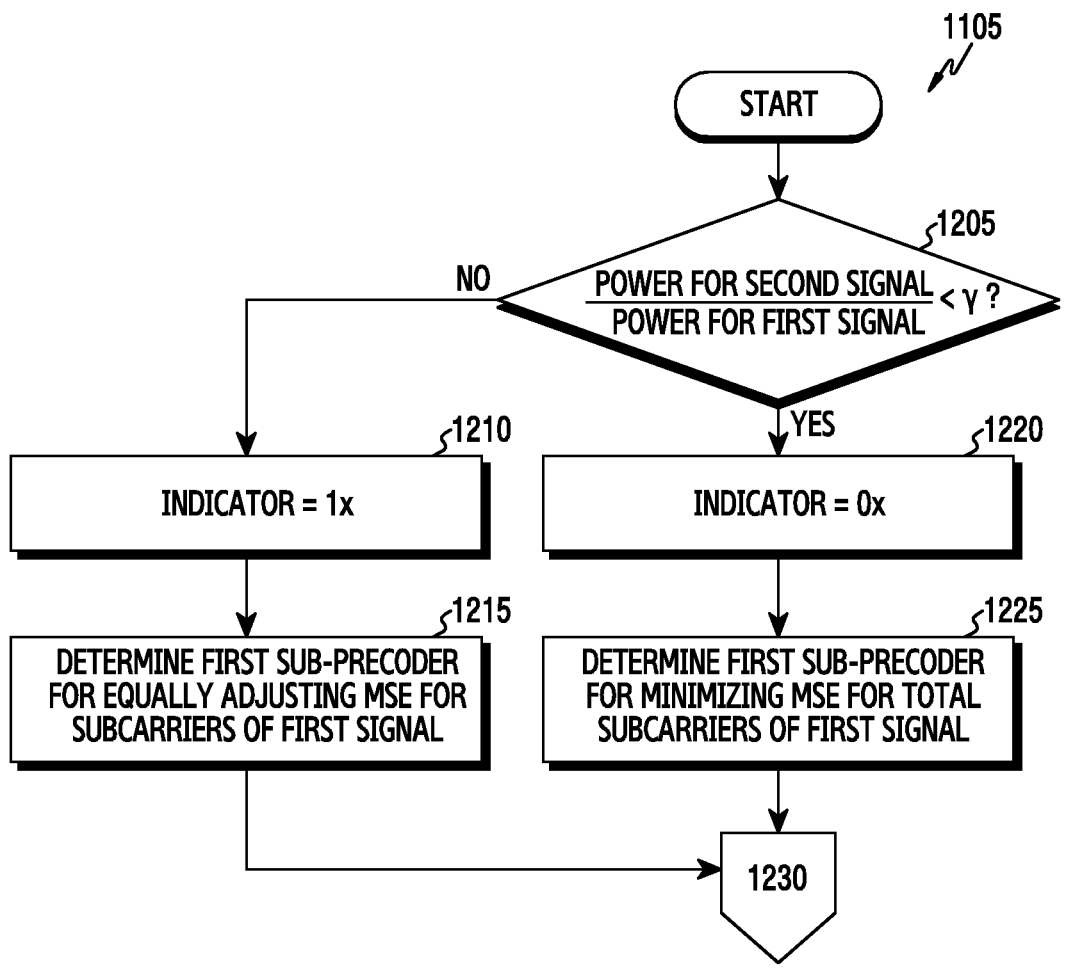
FIG. 12A and FIG. 12B illustrate examples method of operating a transmitting end for determining a precoder indicated by 2 bits in a wireless communication system according to various exemplary embodiments of the present disclosure.
Figure 12B:
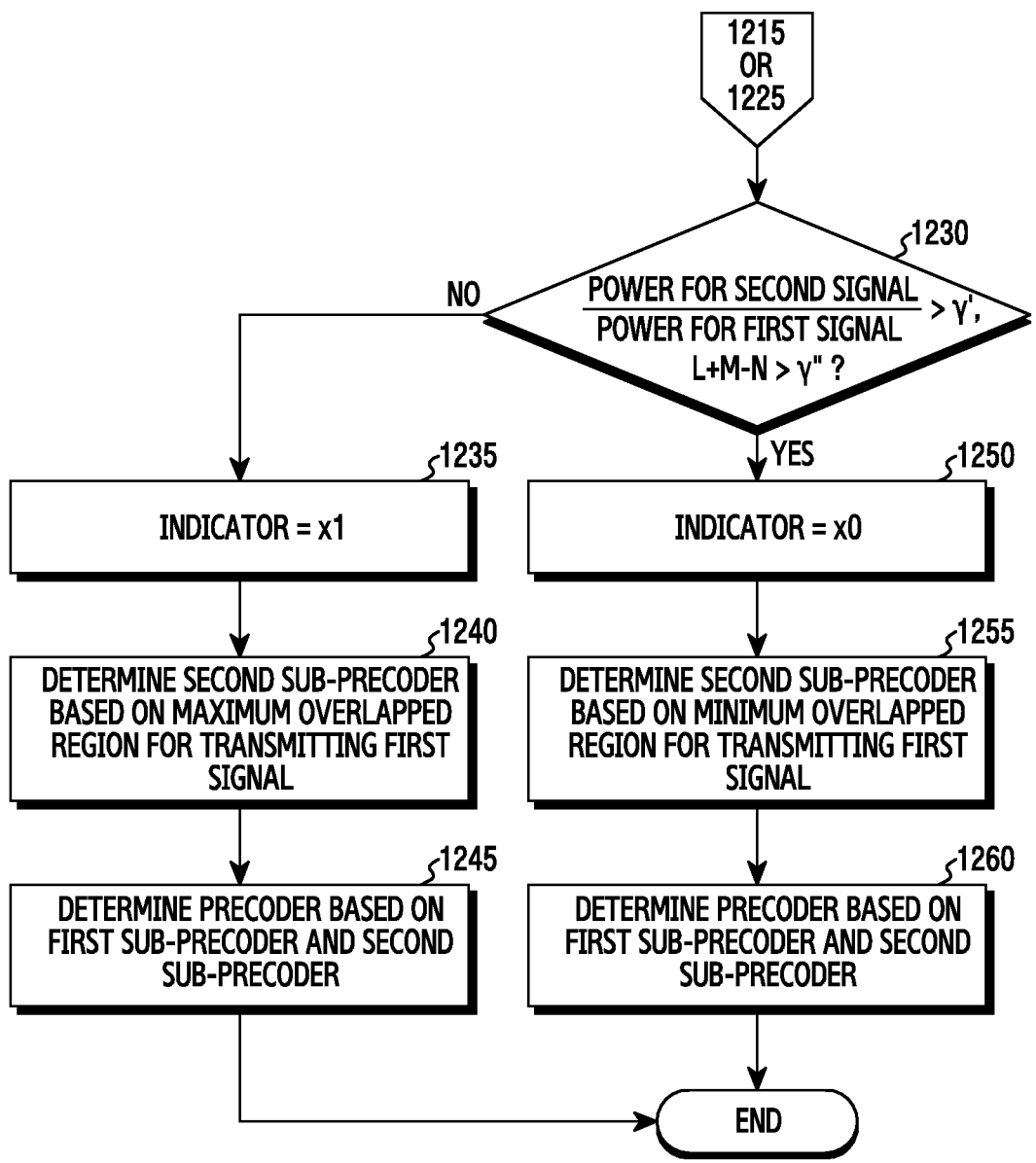

FIG. 12A and FIG. 12B illustrate examples method of operating a transmitting end for determining a precoder indicated by 2 bits in a wireless communication system according to various exemplary embodiments of the present disclosure. FIG. 12 and FIG. 12B exemplify a case where the transmitting end 110 feeds forward an indicator consisting of 2 bits to the receiving end 120, and receives information regarding channel quality from the receiving end 120 in a feedback manner. It is assumed that the transmitting end 110 and the receiving end 120 have information related to power for the first signal, information related to power for the second signal, allocation information of the first resource, and allocation information of the second resource. The information related to the power for the first signal and the second signal may be transmitted to the receiving end 120 together with the allocation information of the first resource and the second resource.

Referring to FIG. 12A, in step 1205, the transmitting end 110 determines whether a ratio of the power for the first signal for the first service and the power for the second signal for the second service is less than a first threshold $\gamma$. The first threshold $\gamma$ is determined on the basis of performance of the first service.

If the ratio of the power for the first signal and the power for the second signal is not less than the first threshold $\gamma$, proceeding to step 1210, the transmitting end 110 sets a first bit of 2 bits of the indicator to 1. The indicator of which the first bit is 1 indicates the first sub-precoder for equally adjusting an MSE for each of subcarriers of the first resource.

In step 1215, the transmitting end 110 determines the first sub-precoder for equally adjusting the MSE for each of the subcarriers of the first signal. The transmitting end 110 determines the first sub-precoder on the basis of first power for an overlapped region of the first resource for transmitting the first signal and the second resource and second power for a non-overlapped region except for the overlapped region among the first resources. The first power is determined on the basis of a value obtained by applying a weight related to power for a channel noise to power for the first signal. The second power is determined on the basis of a value obtained by applying a weight related to power for the channel noise and power for the second signal to power for the first signal.

On the other hand, if the ratio of power for the first signal and power for the second signal is less than the first threshold $\gamma$, proceeding to step 1220, the transmitting end 110 sets a first bit of 2 bits of the indicator to 0. The indicator of which the first bit is 0 indicates the first sub-precoder for minimizing an MSE for total subcarriers of the first resource.

In step 1225, the transmitting end 110 determines the first sub-precoder for minimizing the MSE for the total subcarriers of the first signal. The transmitting end 110 determines the first sub-precoder on the basis of the first power for the overlapped region of the first resource and the second resource and the second power for the non-overlapped region except for the overlapped region among the first resources. The first power is determined on the basis of a value obtained by applying a weight related to the power to the channel noise to a sum of the power for the first signal, the power for the channel noise, and the power of the second signal for the overlapped region. The second power is determined on the basis of a value obtained by applying a weight related to the power for the channel noise and the power for the second signal to the sum of the power for the first signal, the power for the channel noise, and the power of the second signal for the overlapped region.

Referring to FIG. 12B, in step 1230, the transmitting end 110 determines whether the ratio of the power for the first signal and the power for the second signal is greater than the second threshold $\gamma'$ and whether L+M−N is greater than the third threshold $\gamma''$. L+M−N implies a size of a minimum overlapped region for transmitting the first signal.

If the ratio of the power for the first signal and the power for the second signal is not greater than the second threshold $\gamma'$ and if L+M−N is not greater than the third threshold $\gamma''$, proceeding to step 1235, the transmitting end 110 sets a last bit of the 2 bits of the indicator to 1. The indicator of which the last bit is 1 indicates the second sub-precoder for adjusting the overlapped region to the maximum extent.

In step 1240, the transmitting end 110 determines the second sub-precoder on the basis of the maximum overlapped region for transmitting the first signal. The transmitting end 110 determines the second sub-precoder by equally adjusting the overlapped region with respect to the second resource.

In step 1245, the transmitting end 110 determines a precoder on the basis of the first sub-precoder and the second sub-precoder. The precoder may be expressed as a product of the first sub-precoder and the second sub-precoder.

On the other hand, if the ratio of the power for the first signal and the power for the second signal is greater than the second threshold $\gamma'$ and if L+M−N is greater than the third threshold $\gamma''$, proceeding to step 1250, the transmitting end 110 sets the last bit of the 2 bits of the indicator to 0. The indicator of which the last bit is 0 indicates the second sub-precoder for adjusting the overlapped region to the minimum extent.

In step 1255, the transmitting end 110 determines the second sub-precoder for adjusting the overlapped region to the minimum extent. The transmitting end 110 determines the second sub-precoder by equally adjusting the overlapped region with respect to a minimum resource required to transmit the first signal.

In step 1260, the transmitting end 110 determines a precoder on the basis of the first sub-precoder and the second sub-precoder. The precoder may be expressed as the product of the first sub-precoder and the second sub-precoder.

Figure 13:
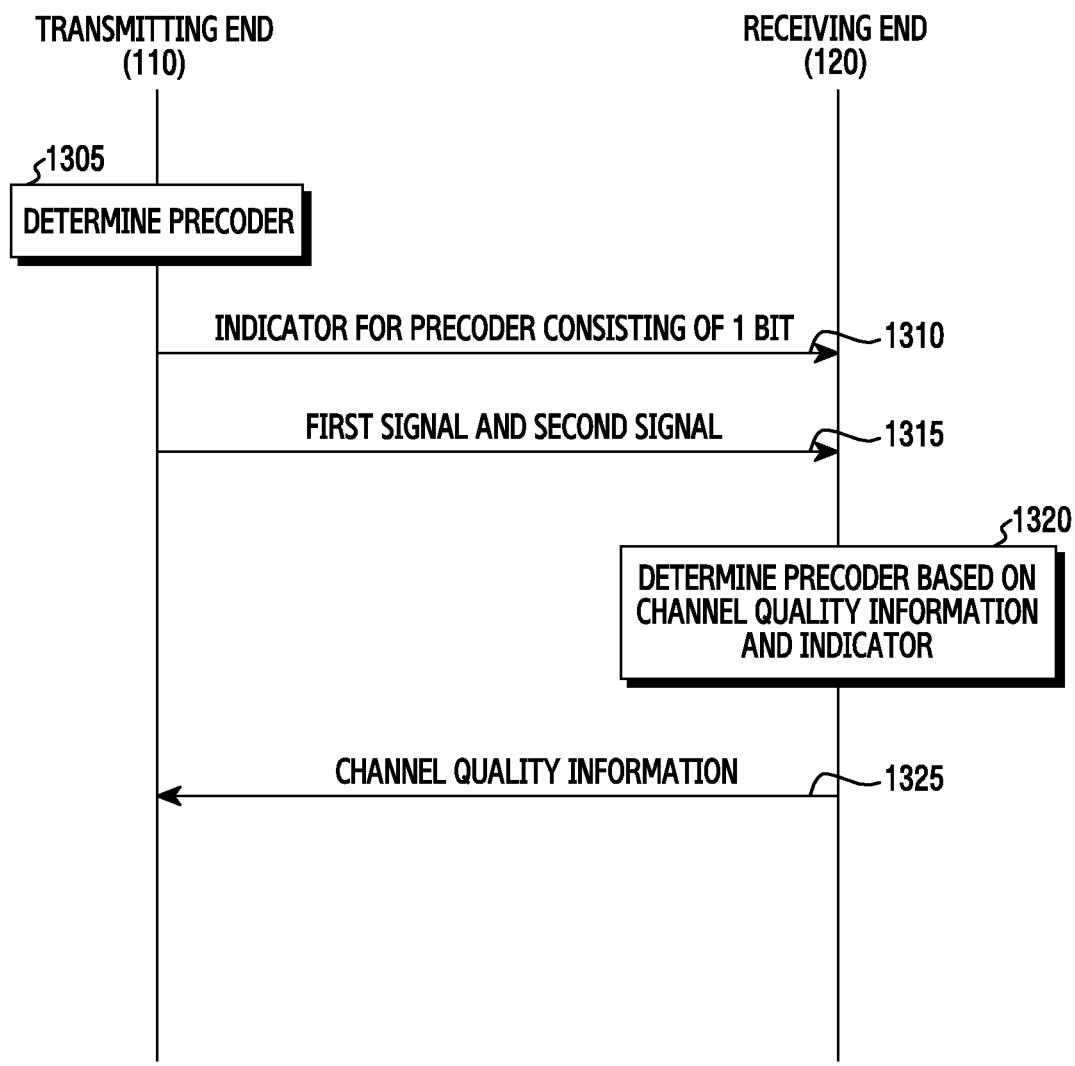
FIG. 13 illustrates an example signal flow between a transmitting end and a receiving end for determining a precoder indicated by 1 bit in a wireless communication system according to various exemplary embodiments of the present disclosure.

FIG. 13 illustrates an example signal flow between a transmitting end and a receiving end for determining a precoder indicated by 1 bit in a wireless communication system according to various exemplary embodiments of the present disclosure. FIG. 13 exemplifies a case where the transmitting end 110 feeds forward an indicator consisting of 1 bit to the receiving end 120, and receives information regarding channel quality from the receiving end 120 in a feedback manner. It is assumed that the transmitting end 110 and the receiving end 120 have information related to power for the first signal, information related to power for the second signal, allocation information of the first resource, and allocation information of the second resource. The information related to the power for the first signal and the second signal may be transmitted to the receiving end 120 together with the allocation information of the first resource and the second resource.

Referring to FIG. 13, in step 1305, the transmitting end 110 determines a precoder. Specifically, the transmitting end 110 determines the first sub-precoder on the basis of first power for the overlapped region of the second resource for the second service and the first resource for the first service and second power for the non-overlapped region except for the overlapped region among the first resources. The transmitting end 110 determines the precoder on the basis of the first sub-precoder and the predetermined second sub-precoder. In some exemplary embodiments, the predetermined second sub-precoder may be a sub-precoder determined by equally adjusting the overlapped region with respect to a minimum resource required to transmit the first signal.

In step 1310, the transmitting end 110 transmits an indicator related to a precoder consisting of 1 bit to the receiving end 120. That is, the transmitting end 110 feeds forward the indicator related to the precoder consisting of 1 bit to the receiving end 120. For example, if the indicator is 0, the indicator 00 indicates a first sub-precoder for minimizing an MSE for total subcarriers of the first signal. If the indicator is 1, the indicator 1 indicates the first sub-precoder for equally adjusting the MSE for each of subcarriers of the first signal.

In step 1315, the transmitting end 110 transmits the first signal and the second signal to the receiving end 120. That is, the transmitting end 110 transmits the precoded first signal and the second signal for the second service through the first resource and the second resource.

In step 1320, the receiving end 120 determines the precoder on the basis of channel quality information and the indicator. In this case, the channel quality includes at least one of an SNR, a CQI, an SINR, and a CINR. The channel quality may include power information regarding a channel noise.

In step 1325, the receiving end 120 transmits information regarding the channel quality to the transmitting end 110. That is, the receiving end 120 feeds back information regarding the channel quality to the transmitting end 110. If the receiving end 120 uses an OFDM modulation scheme, the receiving end 120 constitutes an OFDM symbol for information regarding channel quality, and transmits the OFDM symbol to the receiving end 110.

Figure 14:
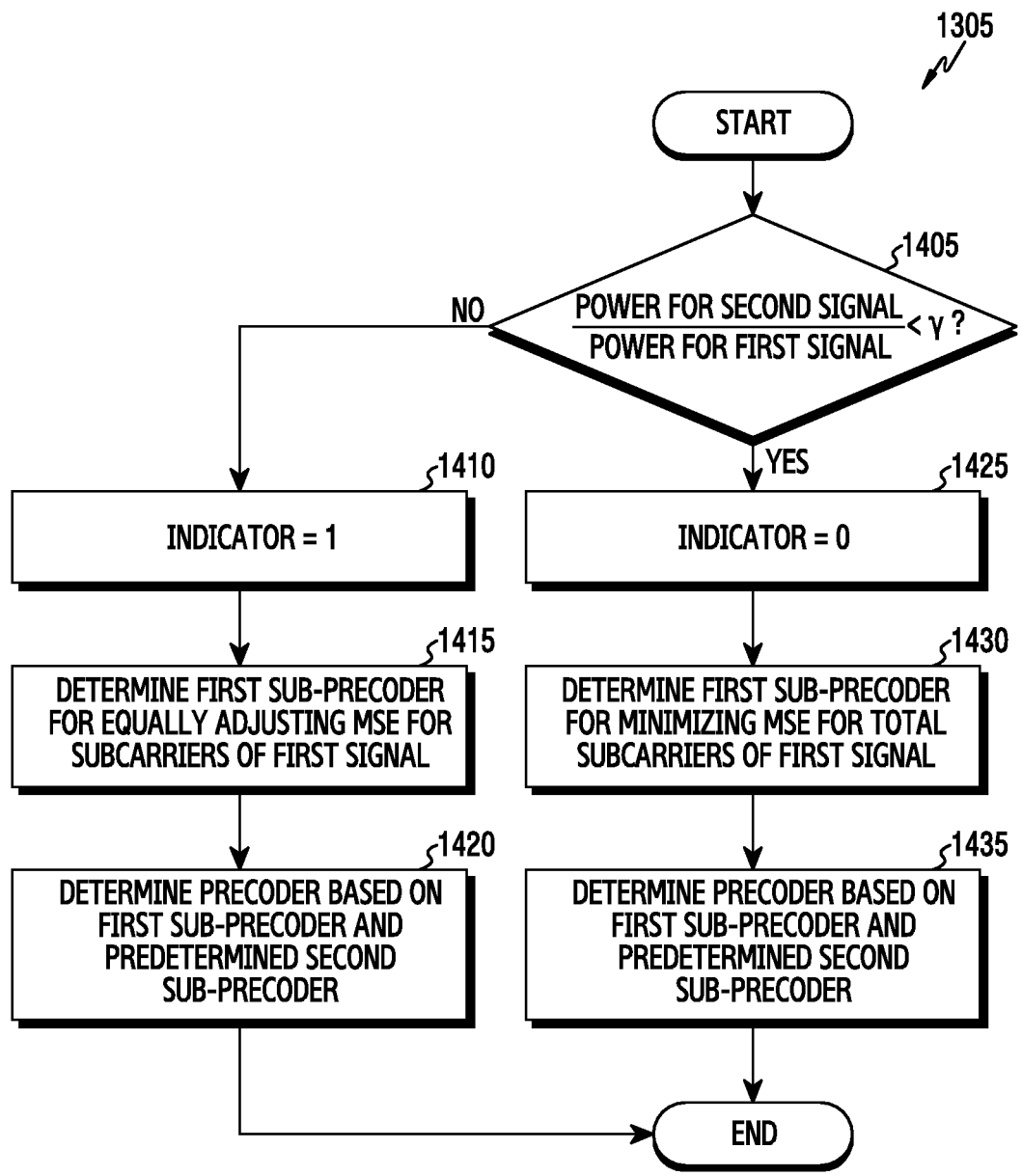
FIG. 14 illustrates an example method of operating a transmitting end for determining a precoder indicated by 1 bit in a wireless communication system according to various exemplary embodiments of the present disclosure.

FIG. 14 illustrates an example method of operating a transmitting end for determining a precoder indicated by 1 bit in a wireless communication system according to various exemplary embodiments of the present disclosure. FIG. 14 exemplifies a case where the transmitting end 110 feeds forward an indicator related to a precoder to the receiving end 120, and receives information regarding channel quality from the receiving end 120 in a feedback manner. It is assumed that the transmitting end 110 and the receiving end 120 have information related to power for the first signal, information related to power for the second signal, allocation information of the first resource, and allocation information for the second resource. The information related to the power for the first signal and the second signal may be transmitted to the receiving end 120 together with the allocation information of the first resource and the second resource.

Referring to FIG. 14, in step 1405, the transmitting end 110 determines whether a ratio of power for a first signal for a first service and power for a second signal for a second service is less than a first threshold $\gamma$. The first threshold $\gamma$ is determined on the basis of performance of the first service.

If the ratio of the power for the first signal and the power for the second signal is not less than the first threshold $\gamma$, proceeding to step 1410, the transmitting end 110 determines the 1-bit indicator to 1. The indicator 1 indicates the first sub-precoder for equally adjusting the MSE for each of subcarriers of the first signal.

In step 1415, the transmitting end 110 determines the first sub-precoder for equally adjusting an MSE for each of subcarriers of the first signal. The first sub-precoder is determined on the basis of first power for the overlapped region of the first resource and the second resource for transmitting the second signal and second power for the non-overlapped region except for the overlapped region among the first resources. The first power is determined on the basis of a value obtained by applying a weight related to power for a channel noise to power for the first signal. The second power is determined on the basis of a value obtained by applying a weight related to power for the channel noise and power for the second signal to power for the first signal.

In step 1420, the transmitting end 110 determines the precoder on the basis of the first sub-precoder and the predetermined second sub-precoder. The precoder may be expressed as a product of the first sub-precoder and the second sub-precoder. In some exemplary embodiments, the predetermined second sub-precoder may be a sub-precoder determined by equally adjusting the overlapped region with respect to a minimum resource required to transmit the first signal.

If the ratio of the power for the first signal and the power for the second signal is not less than the first threshold $\gamma$, proceeding to step 1425, the transmitting end 110 determines the 1-bit indicator to 0. The indicator 0 indicates the first sub-precoder for equally adjusting the MSE for each of subcarriers of the first signal.

In step 1430, the transmitting end 110 determines the first sub-precoder for minimizing the MSE for the total subcarriers of the first signal. The first sub-precoder is determined on the basis of first power for the overlapped region of the first resource and the second resource and second power for the non-overlapped region except for the overlapped region among the first resources. The first power is determined on the basis of a value obtained by applying a weight related to power for a channel noise to a sum of power for the first signal, power for the channel noise, and power for the second signal for the overlapped region. The second power is determined on the basis of a value obtained by applying a weight related to power for the channel noise and power for the second signal to a sum of power for the first signal, power for the channel noise, and power for the second signal for the overlapped region.

In step 1435, the transmitting end 110 determines a precoder on the basis of the first sub-precoder and the second sub-precoder. The precoder may be expressed as the product of the first sub-precoder and the second sub-precoder. In some exemplary embodiments, the predetermined second sub-precoder may be a sub-precoder determined by equally adjusting the overlapped region with respect to a minimum resource required to transmit the first signal.

Figure 15:
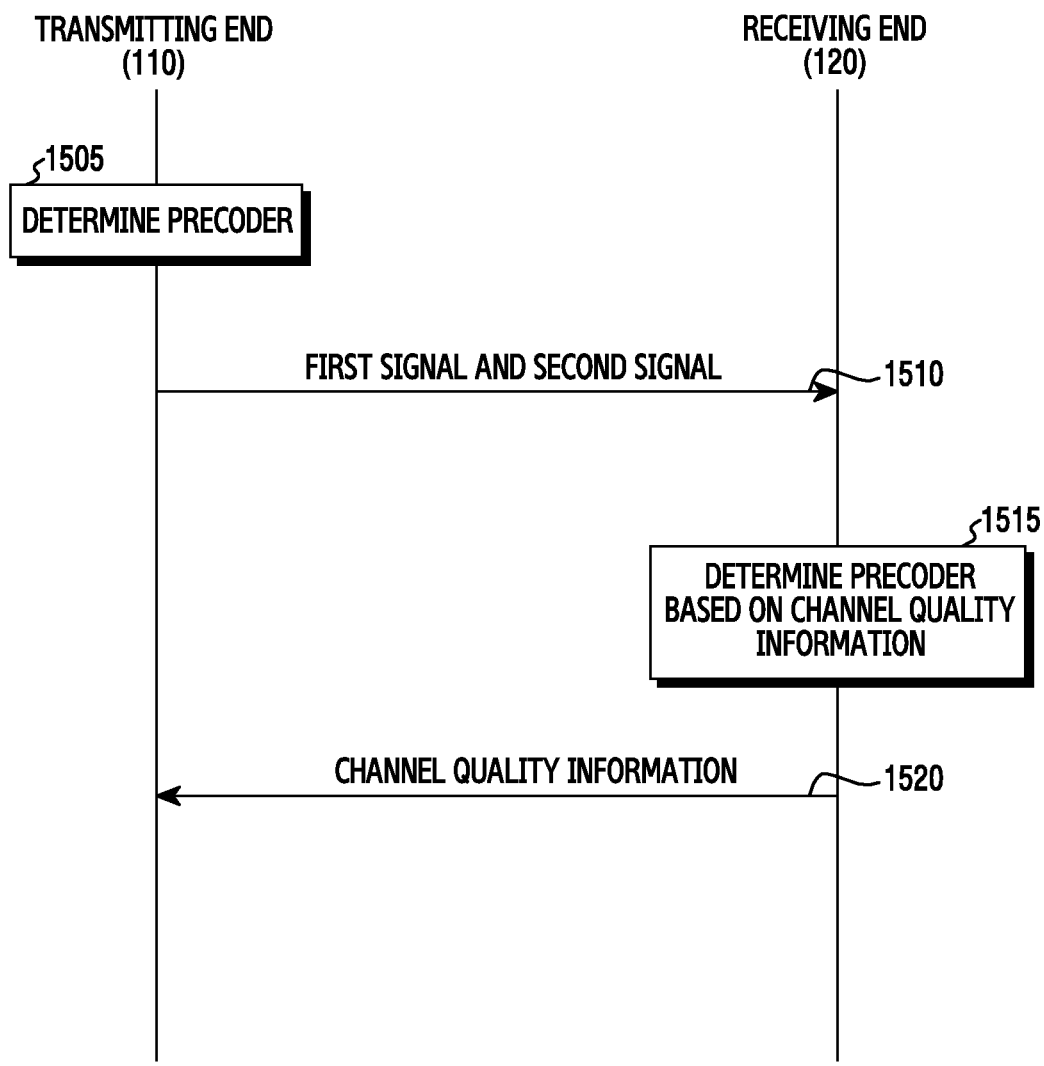
FIG. 15 illustrates an example signal flow between a transmitting end and a receiving end for determining a precoder on the basis of channel quality in a wireless communication system according to various exemplary embodiments of the present disclosure.

FIG. 15 illustrates an example signal flow between a transmitting end and a receiving end for determining a precoder on the basis of channel quality in a wireless communication system according to various exemplary embodiments of the present disclosure. FIG. 15 exemplifies a case where the transmitting end 110 does not feed forward an indicator related to a precoder to the receiving end 120, and receives information regarding channel quality from the receiving end 120 in a feedback manner. It is assumed that the transmitting end 110 and the receiving end 120 have information related to power for the first signal, information related to power for the second signal, allocation information of the first resource, and allocation information for the second resource. The information related to the power for the first signal and the second signal may be transmitted to the receiving end 120 together with the allocation information of the first resource and the second resource.

Referring to FIG. 15, in step 1505, the transmitting end 110 determines a precoder. Specifically, the transmitting end 110 determines the first sub-precoder for minimizing the MSE for the total subcarriers of the first signal. The first sub-precoder is determined on the basis of first power for the overlapped region of the first resource for transmitting the first signal and the second resource for transmitting the second signal and second power for the non-overlapped region except for the overlapped region among the first resources. The transmitting end 110 determines the precoder on the basis of the first sub-precoder and the predetermined second sub-precoder.

In step 1510, the transmitting end 110 transmits the first signal and the second signal to the receiving end 120. That is, the transmitting end 110 transmits the precoded first signal and the second signal for the second service through the first resource and the second resource.

In step 1515, the receiving end 120 determines the first sub-precoder for minimizing the MSE for the total subcarriers of the first signal on the basis of information regarding channel quality. The receiving end 120 determines the precoder on the basis of the first sub-precoder and the predetermined second sub-precoder.

In step 1520, the receiving end 120 transmits information regarding the channel quality to the transmitting end 110. That is, the receiving end 120 feeds back information regarding the channel quality to the transmitting end 110. If the receiving end 120 uses an OFDM modulation scheme, the receiving end 120 constitutes an OFDM symbol for information regarding channel quality, and transmits the OFDM symbol to the receiving end 110.

Figure 16:
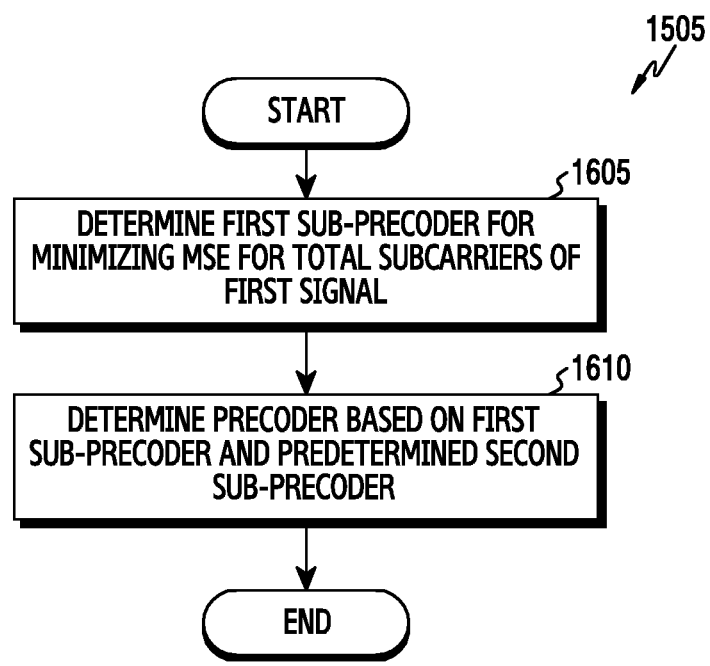
FIG. 16 illustrates an example method of operating a transmitting end for determining a precoder on the basis of channel quality in a wireless communication system according to various exemplary embodiments of the present disclosure.

FIG. 16 illustrates an example method of operating a transmitting end for determining a precoder on the basis of channel quality in a wireless communication system according to various exemplary embodiments of the present disclosure. FIG. 16 exemplifies a case where the transmitting end 110 does not feed forward an indicator related to a precoder to the receiving end 120, and receives information regarding channel quality from the receiving end 120 in a feedback manner. It is assumed that the transmitting end 110 and the receiving end 120 have information related to power for the first signal, information related to power for the second signal, allocation information of the first resource, and allocation information for the second resource. The information related to the power for the first signal and the second signal may be transmitted to the receiving end 120 together with the allocation information of the first resource and the second resource.

Referring to FIG. 16, in step 1605, the transmitting end 110 determines the first sub-precoder for minimizing the MSE for total subcarriers of the first signal. Specifically, the transmitting end 110 determines the first sub-precoder on the basis of first power for an overlapped region of the first resource for transmitting the first signal and the second resource and second power for a non-overlapped region except for the overlapped region among the first resources.

In step 1610, the transmitting end 110 determines a precoder on the basis of the first sub-precoder and the predetermined second sub-precoder. The precoder may be expressed as a product of the first sub-precoder and the second sub-precoder.

Figure 17:
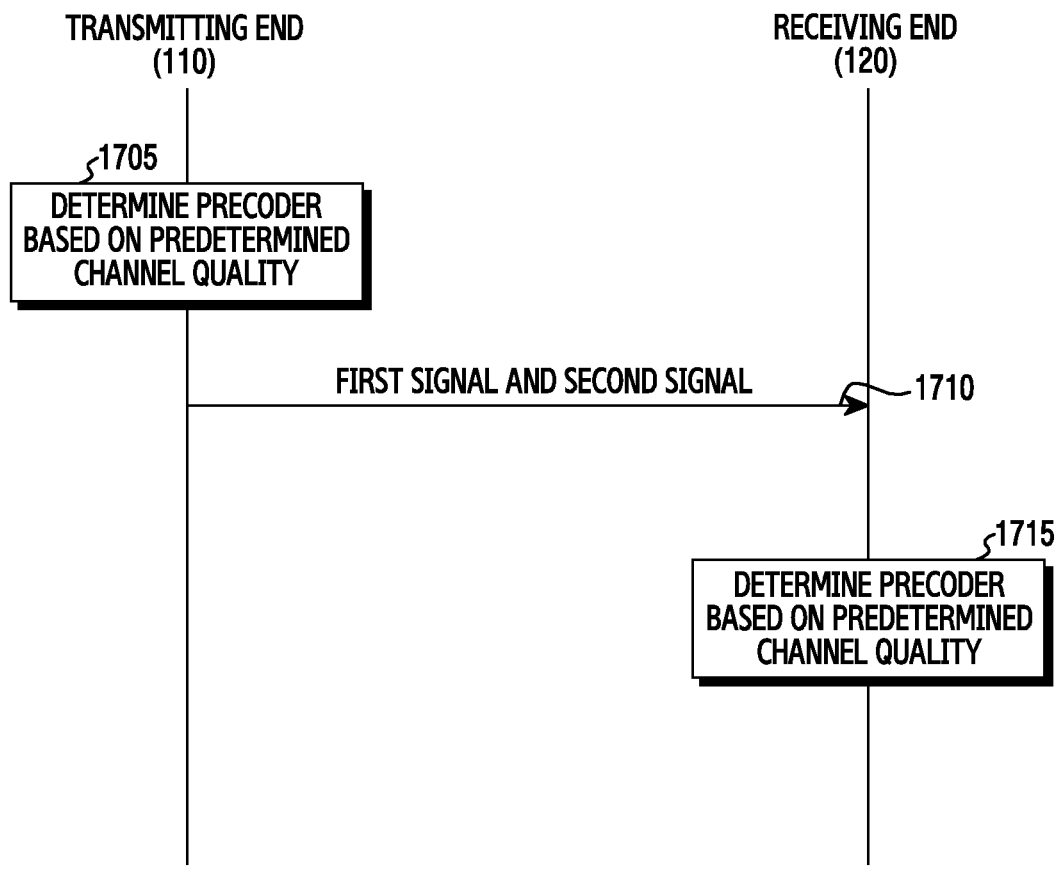
FIG. 17 illustrates an example signal flow between a transmitting end and a receiving end for determining a precoder on the basis of predetermined channel quality in a wireless communication system according to various exemplary embodiments of the present disclosure.

FIG. 17 illustrates an example signal flow between a transmitting end and a receiving end for determining a precoder on the basis of predetermined channel quality in a wireless communication system according to various exemplary embodiments of the present disclosure. FIG. 17 exemplifies a case where the transmitting end 110 does not feed forward an indicator related to a precoder to the receiving end 120, and does not receive information regarding channel quality from the receiving end 120 in a feedback manner. It is assumed that the transmitting end 110 and the receiving end 120 have information related to power for the first signal, information related to power for the second signal, allocation information of the first resource, and allocation information for the second resource. The information related to the power for the first signal and the second signal may be transmitted to the receiving end 120 together with the allocation information of the first resource and the second resource.

Referring to FIG. 17, in step 1705, the transmitting end 110 determines a precoder. Specifically, the transmitting end 110 determines the first sub-precoder for minimizing the MSE for the total subcarriers of the first signal on the basis of the predetermined channel quality. In some exemplary embodiments, the predetermined channel quality may imply at least one of the predetermined SNR, SINR, and CINR. The channel quality may include power information regarding a channel noise. In this case, even if there is no feedback of the information regarding channel quality from the receiving end 120 and thus channel quality is not known accurately, performance of the first service is significantly influenced by interference caused by the overlapped region. Therefore, by using a predetermined channel quality value, the transmitting end 110 may expect sufficiently high performance improvement of the first service even if channel quality is mismatched. The transmitting end 110 determines the precoder on the basis of the first sub-precoder and the predetermined second sub-precoder.

In step 1710, the transmitting end 110 transmits the first signal and the second signal to the receiving end 120. That is, the transmitting end 110 transmits the precoded first signal and the second signal for the second service through the first resource and the second resource.

In step 1715, the receiving end 120 determines the first sub-precoder for minimizing the MSE for the total subcarriers of the first signal on the basis of the predetermined channel quality. The receiving end 120 determines the precoder on the basis of the first sub-precoder and the predetermined second sub-precoder.

Figure 18:
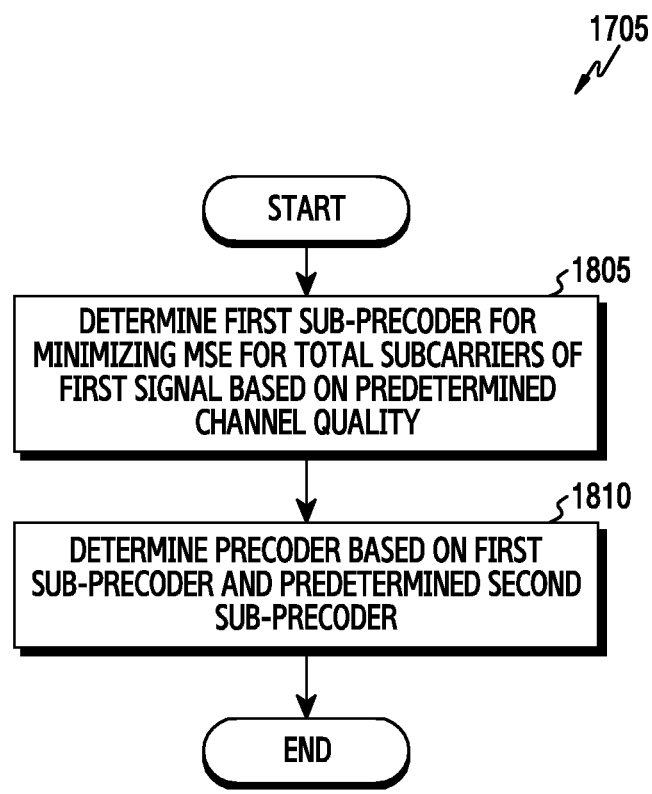
FIG. 18 illustrates an example method of operating a transmitting end for determining a precoder on the basis of predetermined channel quality in a wireless communication system according to various exemplary embodiments of the present disclosure.

FIG. 18 illustrates an example method of operating a transmitting end for determining a precoder on the basis of predetermined channel quality in a wireless communication system according to various exemplary embodiments of the present disclosure. FIG. 18 exemplifies a case where the transmitting end 110 does not feed forward an indicator related to a precoder to the receiving end 120, and does not receive information regarding channel quality from the receiving end 120 in a feedback manner. It is assumed that the transmitting end 110 and the receiving end 120 have information related to power for the first signal, information related to power for the second signal, allocation information of the first resource, and allocation information for the second resource. The information related to the power for the first signal and the second signal may be transmitted to the receiving end 120 together with the allocation information of the first resource and the second resource.

Referring to FIG. 18, in step 1805, the transmitting end 110 determines the first sub-precoder for minimizing the MSE for the total subcarriers of the first signal on the basis of the predetermined channel quality. The predetermined channel quality may imply at least one of the predetermined SNR, SINR, and CINR.

In step 1810, the transmitting end 110 determines the precoder on the basis of the first sub-precoder and the predetermined second sub-precoder. The precoder may be expressed by a product of the first sub-precoder and the second sub-precoder.

When the method described in the present disclosure is applied, performance may be confirmed as shown in Table 1, Table 2, and Table 3 below. When the transmitting end 110 uses the OFDM scheme, it is assumed that the number of subcarriers of a maximum resource that can be used by the transmitting end 110 is 1024. It is assumed that 600 symbols are present to transmit the first signal for the first service, and 600 subcarriers to which power of 1 is allocated per subcarrier are allocated. It is assumed that 500 symbols are present to transmit the second signal for the second service, and 500 subcarriers to which power of 1 is allocated per subcarrier are allocated. It is assumed that the SNR is 10 dB.

For example, performance can be confirmed as shown in Table 1 below in a first situation where the first sub-precoder for equally adjusting the MSE for each of the first signal is applied to the first signal and a second situation where the first sub-precoder for minimizing the MSE for total subcarriers of the first signal is applied to the first signal.

TABLE 1

|  | first situation | second situation |
| --- | --- | --- |
| total MSE | 110.89 | 81.83 |
| average SINR [dB] | 4.4 dB | 6.3 dB |

For another example, performance can be confirmed as shown in Table 2 below in the first situation where the first sub-precoder for equally adjusting the MSE for each of subcarriers of the first signal is applied to the first signal and the second situation where the first sub-precoder for minimizing the MSE for total subcarriers of the first signal is applied to the first signal.

TABLE 2

| SINR [dB] | first situation | second situation |
| --- | --- | --- |
| non-overlapped region | 6.4 dB | 9.3 dB |
| overlapped region | 6.4 dB | 2.7 dB |

For another example, performance can be confirmed as shown in Table 3 below in a third situation where the second sub-precoder for concentrating interference to a minimum overlapped region required to transmit the first signal is applied to the first signal and a fourth situation where the second sub-precoder for distributing the interference to the overlapped region which is the same as the second resource.

TABLE 3

| SINR [dB] | first situation | second situation |
| --- | --- | --- |
| non-overlapped region | 10 dB | |
| overlapped region | −3.3 dB<br>(76 subcarriers) | 6.6 dB<br>(500 subcarriers) |

Methods based on various exemplary embodiments disclosed in the claims and/or specification of the present disclosure can be implemented in hardware, software, or a combination of both.

When implemented in software, computer readable recording medium for storing one or more programs (i.e., software modules) can be provided. The one or more programs stored in the computer readable recording medium are configured to be executed by one or more processors in an electronic device. The one or more programs include instructions for allowing the electronic device to execute the methods based on various exemplary embodiments disclosed in the claims and/or specification of the present disclosure.

The program (i.e., the software module or software) can be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program can be stored in a memory configured in combination of all or some of these storage media. In addition, the configured memory may be plural in number.

Further, the program can be stored in an attachable storage device capable of accessing the electronic device through a communication network such as the Internet, an intranet, a local area network (LAN), a wide LAN (WLAN), or a storage area network (SAN) or a communication network configured by combining the networks. The storage device can access the electronic device for performing an exemplary embodiment of the present disclosure via an external port. In addition, an additional storage on a communication network can access the device for performing the exemplary embodiment of the present disclosure.

In the aforementioned specific exemplary embodiments of the present disclosure, a constitutional element included in the disclosure is expressed in a singular or plural form according to the specific example embodiment proposed herein. However, the singular or plural expression is selected properly for a situation proposed for the convenience of explanation, and thus the present disclosure is not limited to a single or a plurality of constitutional elements. Therefore, a constitutional element expressed in a plural form can also be expressed in a singular form, or vice versa.

Embodiments of the present disclosure according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present disclosure.

Such software may be stored in the form of volatile or non-volatile storage such as, for example, a storage device like a read only memory (ROM), or in the form of memory such as, for example, random access memory (RAM), memory chips, device or integrated circuits or on an optically or magnetically readable medium such as, for example, a compact disc (CD), digital video disc (DVD), magnetic disk or magnetic tape or the like. It will be appreciated that the storage devices and storage media are embodiments of machine-readable storage that are suitable for storing a program or programs comprising instructions that, when executed, implement embodiments of the present disclosure. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to certain preferred embodiments thereof, it will be understood by those skilled in the art that various changes in form and details may be made therein without departing from the spirit and scope of the present disclosure as defined by the appended claims. Therefore, the scope of the present disclosure is defined not by the detailed description thereof but by the appended claims, and all differences within equivalents of the scope will be construed as being included in the present disclosure.

What is claimed is:

1. A method for operating a base station in a wireless communication system, the method comprising:
   allocating second resources for providing a second service;
   allocating first resources for providing a first service after the second resources are allocated;
   determining a precoder to be applied to a first signal for controlling interference between the first signal for the first service and a second signal for the second service based on an overlapped region for transmitting the first signal and a ratio of a power for the first service and a power for the second service, wherein the precoder is determined based on a first sub-precoder and a second sub-precoder;
   precoding the first signal for the first service by using the determined precoder; and
   transmitting, to a terminal, the precoded first signal through the first resources and the second signal through the second resources,
   wherein if the ratio is less than a first threshold, the first sub-precoder is determined to minimize a mean square error (MSE) for total subcarriers of the first signal,
   wherein if the ratio is not less than the first threshold, the first sub-precoder is determined such that the MSE is identical for each of subcarriers of the first signal,
   wherein if the ratio is not less than a second threshold different from the first threshold and if a minimum size of the overlapped region for transmitting the first signal is not less than a third threshold, the second sub-precoder is determined to minimize the overlapped region,
   wherein if the ratio is less than the second threshold and if the minimum size of the overlapped region for transmitting the first signal is less than the third threshold, the second sub-precoder is determined to maximize the overlapped region, and
   wherein the overlapped region is a region in which at least one part of the first resources overlaps with at least one part of the second resources.

2. The method of claim 1, wherein the precoder is determined based on a first sub-precoder for controlling power and a second sub-precoder for controlling a size of the overlapped region,
   wherein the first sub-precoder is determined based on a first power for the overlapped region and a second power for a non-overlapped region other that the overlapped region among the first resources, and
   wherein the second sub-precoder is determined based on the size of the overlapped region.

3. The method of claim 1, wherein the first service is associated with an ultra-reliable and low-latency (URLL) service and the second service is associated with an enhanced mobile broadband (eMBB) service, and
   wherein the determined precoder is applied to the at least one part among the first resources.

4. The method of claim 1, wherein the precoder is used to adjust a power applied to the overlapped region based on a mean square error (MSE) for each subcarrier of the first signal.

5. The method of claim 1, wherein the overlapped region is determined based on a size of the first service, a size of the second service, and a size of maximum resources for the base station.

6. A base station in a wireless communication system, the base station comprising:
   at least one transceiver; and
   at least one processor operably coupled to the at least one transceiver, configured to:
   allocate second resources for providing a second service,
   allocate first resources for providing a first service after the second resources are allocated,
   determine a precoder to be applied to a first signal for controlling interference between the first signal for the first service and a second signal for the second service based on an overlapped region for transmitting the first signal and a ratio of a power for the first service and a power for the second service, wherein the precoder is determined based on a first sub-precoder and a second sub-precoder,
   precode the first signal for the first service by using the determined precoder, and control the at least one transceiver to transmit, to a
terminal, the precoded first signal through the first
resources and the second signal through the second
resources, wherein if the ratio is less than a first threshold, the first
sub-precoder is determined to minimize a mean square
error (MSE) for total subcarriers of the first signal, wherein if the ratio is not less than the first threshold, the
first sub-precoder is determined such that the MSE is
identical for each of subcarriers of the first signal, wherein if the ratio is not less than a second threshold
different from the first threshold and if a minimum size
of the overlapped region for transmitting the first signal
is not less than a third threshold, the second sub-
precoder is determined to minimize the overlapped
region, wherein if the ratio is less than the second threshold and
if the minimum size of the overlapped region for
transmitting the first signal is less than the third thresh-
old, the second sub-precoder is determined to maxi-
mize the overlapped region, and wherein the overlapped region is a region in which at least
one part of the first resources overlaps with at least one
part of the second resources.

7. The base station of claim 6,
wherein the precoder is determined based on a first
sub-precoder for controlling power and a second sub-
precoder for controlling a size of the overlapped region, wherein the first sub-precoder is determined based on a
first power for the overlapped region and a second
power for a non-overlapped region other that the over-
lapped region among the first resources, and wherein the second sub-precoder is determined based on
the size of the overlapped region.

8. The base station of claim 6, wherein the at least one
processor is further configured to control the at least one
transceiver to transmit a signal for indicating a first sub-
precoder and a second sub-precoder; and
receive, from the terminal, channel quality information
based on the precoder, wherein the channel quality information includes infor-
mation regarding a power for a channel noise, and wherein the precoder is determined based on the first
sub-precoder and the second sub-precoder.

9. The base station of claim 6, wherein the first service is
associated with an ultra-reliable and low-latency (URLL)
service and the second service is associated with an
enhanced mobile broadband (eMBB) service, and
wherein the determined precoder is applied to the at least
one part among the first resources.

10. The base station of claim 6, wherein the precoder is
used to adjust a power applied to the overlapped region
based on a mean square error (MSE) for each subcarrier of
the first signal.

* * * * *